US010069886B1

(12) United States Patent
Lundsgaard

(10) Patent No.: US 10,069,886 B1
(45) Date of Patent: Sep. 4, 2018

(54) SYSTEMS AND METHODS FOR MODULATING ADVERTISEMENT FREQUENCIES IN STREAMING SIGNALS BASED ON VEHICLE OPERATION DATA

(71) Applicant: Allstate Insurance Company, Northbrook, IL (US)

(72) Inventor: Soren K. Lundsgaard, Inverness, IL (US)

(73) Assignee: Allstate Insurance Company, Northbrook, IL (US)

(*) Notice: Subject to any disclaimer, the term of this patent is extended or adjusted under 35 U.S.C. 154(b) by 192 days.

(21) Appl. No.: 15/278,849

(22) Filed: Sep. 28, 2016

(51) Int. Cl.
*H04L 29/06* (2006.01)
*H04L 29/08* (2006.01)

(52) U.S. Cl.
CPC .............. *H04L 65/60* (2013.01); *H04L 67/12* (2013.01); *H04L 67/02* (2013.01)

(58) Field of Classification Search
CPC .......... H04L 65/60; H04L 67/12; H04L 67/02
See application file for complete search history.

(56) References Cited

U.S. PATENT DOCUMENTS

| | | | |
|---|---|---|---|
| 8,055,540 B2 | 11/2011 | Pudar | |
| 8,065,364 B2 | 11/2011 | Rakers et al. | |
| 8,478,514 B2 | 7/2013 | Kargupta | |
| 8,504,575 B2 | 8/2013 | Koran et al. | |
| 8,533,040 B2 | 9/2013 | Collins | |
| 8,849,509 B2 | 9/2014 | Liu et al. | |
| 9,067,565 B2 | 6/2015 | McClellan et al. | |
| 9,117,246 B2 | 8/2015 | McClellan | |
| 9,269,202 B2 | 2/2016 | Phelan et al. | |
| 2008/0172293 A1 | 7/2008 | Raskin et al. | |
| 2009/0157499 A1 | 6/2009 | Panabaker et al. | |
| 2011/0196747 A1* | 8/2011 | Karidi ................. | G06Q 30/02 705/14.71 |

(Continued)

OTHER PUBLICATIONS

Castillo, Michelle, "Pandora Increases Programmatic Offerings, Allows for Demographic Targeting Brrands Can Use Data for Unique Opportunities", Adweek, Apr. 16, 2015, retrieved from internet Jul. 6, 2015, URL: www.adweek.com/news/technology/pandora-increases-programmatic-offerings-allows-demographic-targeting-164116.

(Continued)

*Primary Examiner* — Tauqir Hussain
*Assistant Examiner* — Steve Lin
(74) *Attorney, Agent, or Firm* — Banner & Witcoff, Ltd.

(57) ABSTRACT

An improved media streaming device and methods are disclosed herein for receiving and modifying a streaming signal to adjust the rate of occurrence of advertisements based on sensor data collected from various sensors associated with a vehicle and a mobile device found within an interior of a vehicle. The improved media streaming device may receive a risk score based on the collected sensor data, and may determine an advertisement tier based on the risk score. Further, the improved media streaming device may select targeted advertisement content based on at least the sensor data, the calculated risk score, the advertisement tier, and other contextual attributes relating to the driver and/or the vehicle. The improved media streaming device may then modify the streaming signal to inject the selected advertisement at the frequency prescribed by the advertisement tier.

20 Claims, 8 Drawing Sheets

(56) References Cited

U.S. PATENT DOCUMENTS

| | | |
|---|---|---|
| 2011/0264511 A1* | 10/2011 | Zhang .................. G06Q 30/02 705/14.43 |
| 2012/0271713 A1 | 10/2012 | Nussel et al. |
| 2013/0024287 A1 | 1/2013 | MacNeille et al. |
| 2014/0006164 A1 | 1/2014 | Bellegante et al. |
| 2014/0207563 A1 | 7/2014 | Liu et al. |
| 2014/0309849 A1 | 10/2014 | Ricci |
| 2015/0032366 A1 | 1/2015 | Man et al. |
| 2015/0254955 A1 | 9/2015 | Fields et al. |

OTHER PUBLICATIONS

Fung, Derek, "Music Streaming Apps for the Car", Caradvice, Mar. 18, 2014; retrieved from Internet Aug. 8, 2016, URL: www.caradvice.com/au/277885/music-streaming-apps-for-the-car-spotify-v-rdio-v-radio-v-tunein/.

Heinze, Johannes, "How the Rise of Driverless Cars Will Transform the Advertising Industry", Connected CarTech, Jul. 4, 2016; retrieved from Internet Aug. 8, 2016; URL: www.connectedcar-news.com/news/2016/jul/04/how-rise-driverless-cars-will-transform-advertising-industry/.

* cited by examiner

SYSTEMS AND METHODS FOR MODULATING ADVERTISEMENT FREQUENCIES IN STREAMING SIGNALS BASED ON VEHICLE OPERATION DATA

TECHNICAL FIELD

Aspects of the disclosure generally relate to a novel media streaming device within a vehicle that increases or decreases the recurrence of inserted advertisements into the streamed media based on the analysis of vehicle operation data to provide rewards and/or consequences to the driver. In particular, various aspects of the disclosure relating to receiving and transmitting sensor data from a mobile device and/or a vehicle, analyzing the data to calculate a risk score and determine an advertisement tier, and modifying a streaming signal to inject advertisements at a particular frequency based on the advertisement tier.

BACKGROUND

Insurance providers value the safety of drivers and the general public. Accordingly, rewarding safe driving behaviors is a matter of good policy. Although techniques exist to generally encourage safe driving, they might not provide a mechanism whereby rewards for drivers engaging in safe driving behaviors are reflected via advertisements in a streaming signal. Further, these techniques might not provide for modulating the frequency of the advertisements in the streaming signal as an incentive to engage in safe driving behaviors.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Advantageous solutions to the problems presented above, and other issues which will be apparent upon the reading of the present disclosure, may be to receive a streaming signal at an improved media streaming device from a streaming content provider, where the streaming signal is associated with a default advertisement tier, where the default advertisement tier is associated with a baseline advertisement frequency, and where the streaming signal includes media content and advertisement content. Sensor data may be collected from sensors associated with a vehicle and a mobile device located within the vehicle. The sensor data may be analyzed to determine a risk score based on a plurality of factors, and the risk score may be used to determine a first advertisement tier associated with a first advertisement frequency greater than the baseline advertisement frequency. A first advertisement may be selected based on at least the sensor data, the risk score, the first advertisement tier, and contextual attributes relating to the driver and/or vehicle. The streaming signal may accordingly be modified to inject the selected first advertisement based on the first advertisement frequency associated with the first advertisement tier. The improved media streaming device may output the first advertisement followed by the media content of the streaming signal. The improved media streaming device may then receive an improved risk score based on additional sensor data. Responsive to the improved risk score, the improved media streaming device may determine a second advertisement tier associated with a second advertisement frequency less than the first advertisement frequency. A second advertisement may be selected based on at least the additional sensor data, the improved risk score, the second advertisement tier, and the contextual attributes. The streaming signal may accordingly be modified to inject the selected second advertisement based on the second advertisement frequency associated with the second advertisement tier. The improved media streaming device may output the second advertisement followed by the media content of the streaming signal.

In accordance with further aspects of the present disclosure, a method disclosed herein may include receiving a streaming signal at an improved media streaming device from a streaming content provider, where the streaming signal is associated with a default advertisement tier, where the default advertisement tier is associated with a first advertisement frequency, and where the streaming signal includes media content and advertisement content. Sensor data may be collected from sensors associated with a vehicle and a mobile device located within the vehicle. The sensor data may be analyzed to determine a risk score based on a plurality of factors, and the risk score may be used to determine a first advertisement tier associated with a second advertisement frequency. A first set of advertisements may be selected based on at least the sensor data, the risk score, the first advertisement tier, and contextual attributes relating to the driver and/or vehicle. The streaming signal may accordingly be modified to inject the at least one of the first set of selected advertisements based on the second advertisement frequency associated with the first advertisement tier. The improved media streaming device may output at least one of the first set of selected advertisements followed by the media content of the streaming signal. The improved media streaming device may then receive an improved risk score based on additional sensor data. Response to the improved risk score, the improved media streaming device may determine a second advertisement tier associated with a third advertisement frequency less than the second advertisement frequency. A second set of advertisements may be selected based on at least the additional sensor data, the improved risk score, the second advertisement tier, and the contextual attributes. The streaming signal may accordingly be modified by inject at least one of the second set of selected advertisements based on the third advertisement frequency associated with the second advertisement tier. The improved media streaming device may output at least one of the second set of selected advertisements followed by the media content of the streaming signal.

In accordance with further aspects of the present disclosure, a computer-assisted method of modulating advertisement frequency in streaming signals disclosed herein may include receiving a streaming signal at an improved media streaming device from a streaming content provider, where the streaming signal is associated with a default advertisement tier, where the default advertisement tier is associated with a first advertisement frequency, and where the streaming signal includes media content and advertisement content. Sensor data may be collected from sensors associated with a vehicle and a mobile device located within the vehicle. The sensor data may be analyzed to determine a risk score based on a plurality of factors, and the risk score may be used to determine a first advertisement tier associated with a second advertisement frequency. A first set of advertisements may be selected based on at least the sensor data, the risk score, the first advertisement tier, and contextual attributes relating to the driver and/or vehicle. The streaming signal may accordingly be modified to inject the at least one of the first set of selected advertisements based on the second advertisement frequency associated with the first advertisement tier. The improved media streaming device may output at least one of the first set of selected advertisements followed by the media content of the streaming signal. The improved media streaming device may then receive an improved risk score based on additional sensor data. Response to the improved risk score, the improved media streaming device may determine a second advertisement tier associated with a third advertisement frequency less than the second advertisement frequency. A second set of advertisements may be selected based on at least the additional sensor data, the improved risk score, the second advertisement tier, and the contextual attributes. The streaming signal may accordingly be modified by inject at least one of the second set of selected advertisements based on the third advertisement frequency associated with the second advertisement tier. The improved media streaming device may output at least one of the second set of selected advertisements followed by the media content of the streaming signal.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a specially-programmed computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
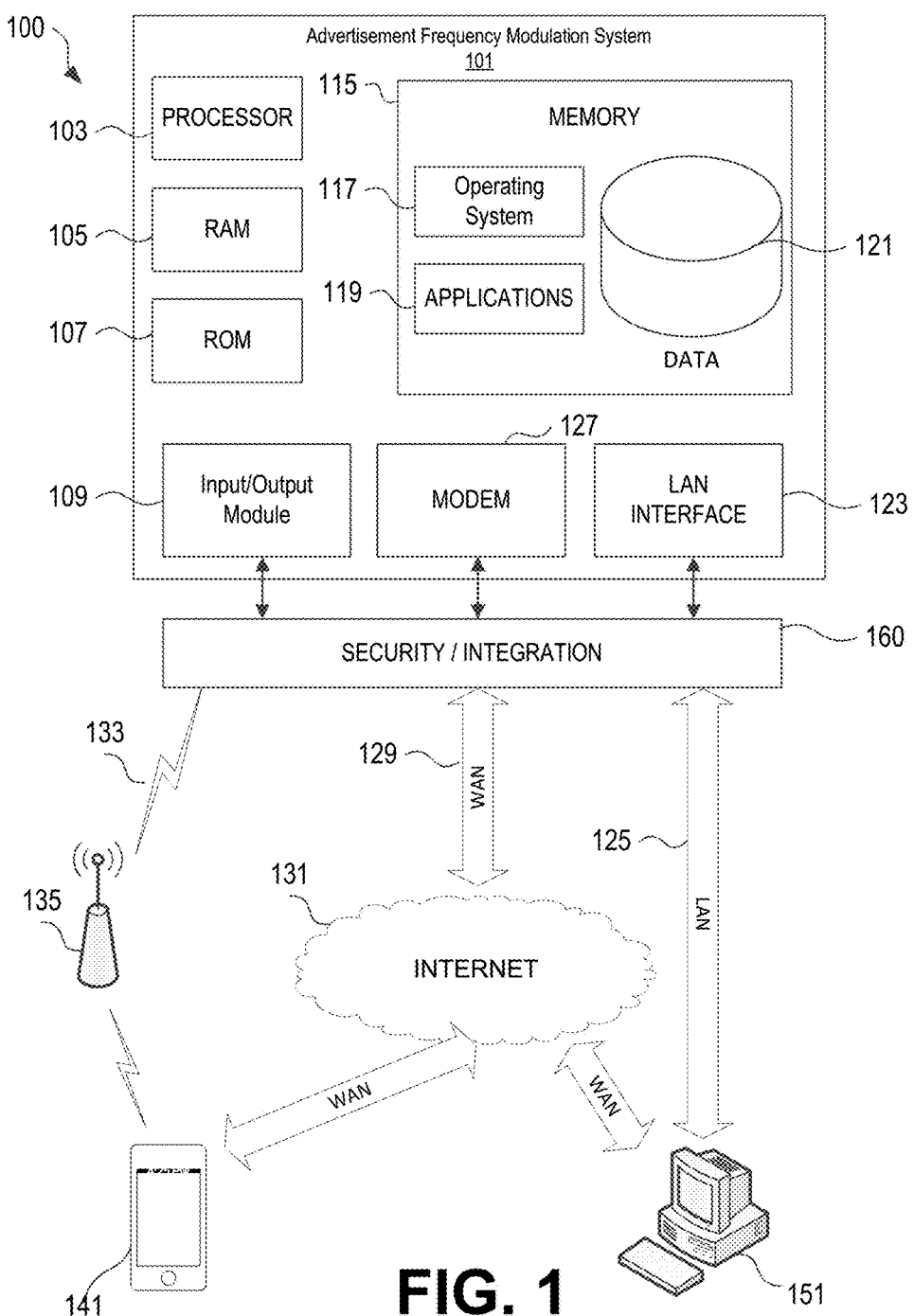
FIG. 1 illustrates a network environment and computing systems that may be used to implement aspects of the disclosure.

FIG. 1 illustrates a block diagram of an advertisement frequency modulation system 101 in an advertisement frequency rewards system 100 that may be used according to one or more illustrative embodiments of the disclosure. The advertisement frequency modulation system 101 may have a processor 103 for controlling overall operation of the advertisement frequency modulation system 101 and its associated components, including RAM 105, ROM 107, input/output module 109, and memory 115. The advertisement frequency modulation system 101, along with one or more additional devices (e.g., terminals 141, 151) may correspond to one or more special-purpose computing devices, such as advertisement frequency rewards computing devices or systems, including mobile computing devices (e.g., smartphones, smart terminals, tablets, and the like) and vehicular-based computing devices, configured as described herein for receiving a streaming signal, collecting and analyzing sensor data from vehicles and/or mobile devices associated with vehicles, calculating a risk score, determining an advertisement tier, selecting advertisement content, and modifying a streaming signal to inject the selected advertisement content.

Input/Output (I/O) 109 may include a microphone, keypad, touch screen, and/or stylus through which a user of the advertisement frequency modulation system 101 may provide input, and may also include one or more of a speaker for providing audio output and a video display device for providing textual, audiovisual and/or graphical output. Software may be stored within memory 115 and/or storage to provide instructions to processor 103 for enabling the advertisement frequency modulation system 101 to perform various functions. For example, memory 115 may store software used by the advertisement frequency modulation system 101, such as an operating system 117, application programs 119, and an associated internal database 121. Processor 103 and its associated components may allow the advertisement frequency modulation system 101 to execute a series of computer-readable instructions to receive streaming signals, collect and analyze sensor data, determine risk scores, determine advertisement tiers, select advertisement content, and modify streaming signals to inject advertisement content.

The advertisement frequency modulation system 101 may operate in a networked environment supporting connections to one or more remote computers, such as terminals/devices 141 and 151. The advertisement frequency modulation system 101, and related terminals/devices 141 and 151, may be in signal communication with special-purpose devices installed in vehicles, mobile devices that may travel within vehicles, or devices outside of vehicles that are configured to receive and process sensor data. Thus, the advertisement frequency modulation system 101 and terminals/devices 141 and 151 may each include personal computers (e.g., laptop, desktop, or tablet computers), servers (e.g., web servers, database servers), vehicle-based devices (e.g., on-board vehicle computers, short-range vehicle communication systems, telematics devices), or mobile communication devices (e.g., mobile phones, portable computing devices, and the like), and may include some or all of the elements described above with respect to the advertisement frequency modulation system 101.

The network connections depicted in FIG. 1 include a local area network (LAN) 125 and a wide area network (WAN) 129, and a wireless telecommunications network 133, but may also include other networks. When used in a LAN networking environment, the advertisement frequency modulation system 101 may be connected to the LAN 125 through a network interface or adapter 123. When used in a WAN networking environment, the advertisement frequency modulation system 101 may include a modem 127 or other means for establishing communications over the WAN 129, such as network 131 (e.g., the Internet). When used in a wireless telecommunications network 133, the advertisement frequency modulation system 101 may include one or more transceivers, digital signal processors, and additional circuitry and software for communicating with wireless computing devices 141 (e.g., mobile phones, short-range vehicle communication systems, vehicle telematics devices) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices and mobile device location and configuration system components described herein may be configured to communicate using any of these network protocols or technologies.

Also illustrated in FIG. 1 is a security and integration layer 160, through which communications may be sent and managed between the advertisement frequency modulation system 101 (e.g., a user's personal mobile device, a vehicle-based system, external server, etc.) and the remote devices (141 and 151) and remote networks (125, 129, and 133). The security and integration layer 160 may comprise one or more separate computing devices, such as web servers, authentication servers, and/or various networking components (e.g., firewalls, routers, gateways, load balancers, etc.), having some or all of the elements described above with respect to the advertisement frequency modulation system 101. As an example, a security and integration layer 160 of a mobile computing device, vehicle-based device, or a server operated by an insurance provider, financial institution, governmental entity, or other organization, may comprise a set of web application servers configured to use secure protocols and to insulate the advertisement frequency modulation system 101 from external devices 141 and 151. In some cases, the security and integration layer 160 may correspond to a set of dedicated hardware and/or software operating at the same physical location and under the control of same entities as the advertisement frequency modulation system 101. For example, layer 160 may correspond to one or more dedicated web servers and network hardware in an organizational datacenter or in a cloud infrastructure supporting a cloud-based mobile device location and configuration system. In other examples, the security and integration layer 160 may correspond to separate hardware and software components which may be operated at a separate physical location and/or by a separate entity.

As discussed below, the data transferred to and from various devices in advertisement frequency rewards system 100 may include secure and sensitive data, such as driving data, driving locations, vehicle data, and confidential individual data such as insurance data associated with vehicle occupants. In at least some examples, transmission of the data may be performed based on one or more user permissions provided. Therefore, it may be desirable to protect transmissions of such data by using secure network protocols and encryption, and also to protect the integrity of the data when stored in a database or other storage in a mobile device, analysis server, or other computing devices in the advertisement frequency rewards system 100, by using the security and integration layer 160 to authenticate users and restrict access to unknown or unauthorized users. In various implementations, security and integration layer 160 may provide, for example, a file-based integration scheme or a service-based integration scheme for transmitting data between the various devices in the advertisement frequency rewards system 100. Data may be transmitted through the security and integration layer 160, using various network communication protocols. Secure data transmission protocols and/or encryption may be used in file transfers to protect to integrity of the driving data, for example, File Transfer Protocol (FTP), Secure File Transfer Protocol (SFTP), and/or Pretty Good Privacy (PGP) encryption.

In other examples, one or more web services may be implemented within the advertisement frequency modulation system 101 in the advertisement frequency rewards system 100 and/or the security and integration layer 160. The web services may be accessed by authorized external devices and users to support input, extraction, and manipulation of the data (e.g., driving data, location data, confidential personal data, etc.) between the m advertisement frequency modulation system 101 in the advertisement frequency rewards system 100. Web services built to support the advertisement frequency rewards system 100 may be cross-domain and/or cross-platform, and may be built for enterprise use. Such web services may be developed in accordance with various web service standards, such as the Web Service Interoperability (WS-I) guidelines. In some examples, an advertisement data and/or driving data web service may be implemented in the security and integration layer 160 using the Secure Sockets Layer (SSL) or Transport Layer Security (TLS) protocol to provide secure connections between servers (e.g., advertisement frequency modulation system 101) and various clients 141 and 151 (e.g., mobile devices, data analysis servers, etc.). SSL or TLS may use HTTP or HTTPS to provide authentication and confidentiality.

In other examples, such web services may be implemented using the WS-Security standard, which provides for secure SOAP messages using XML encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1, various elements within memory 115 or other components in the advertisement frequency rewards system 100, may include one or more caches, for example, CPU caches used by the processing unit 103, page caches used by the operating system 117, disk caches of a hard drive, and/or database caches used to cache content from database 121. For embodiments including a CPU cache, the CPU cache may be used by one or more processors in the processing unit 103 to reduce memory latency and access time. In such examples, a processor 103 may retrieve data from or write data to the CPU cache rather than reading/writing to memory 115, which may improve the speed of these operations. In some examples, a database cache may be created in which certain data from a database 121 (e.g., a driving database, a vehicle database, insurance customer database, etc.) is cached in a separate smaller database on an application server separate from the database server. For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of receiving streaming signals, and/or retrieving and analyzing sensor data, such as faster response times and less dependence on network conditions when transmitting/receiving streaming data, sensor data, vehicle data, occupant data, etc.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computer devices and system components described herein may be configured to communicate using any of these network protocols or technologies.

Additionally, one or more application programs 119 may be used by the advertisement frequency modulation system 101 within the advertisement frequency rewards system 100 (e.g., advertisement frequency modulation software applications, and the like), including computer executable instructions for receiving a streaming signal, collecting and analyzing sensor data from vehicles and/or mobile devices associated with vehicles, calculating a risk score, determining an advertisement tier, selecting advertisement content, modifying a streaming signal to inject the selected advertisement content, and/or performing other related functions as described herein.

Figure 2:
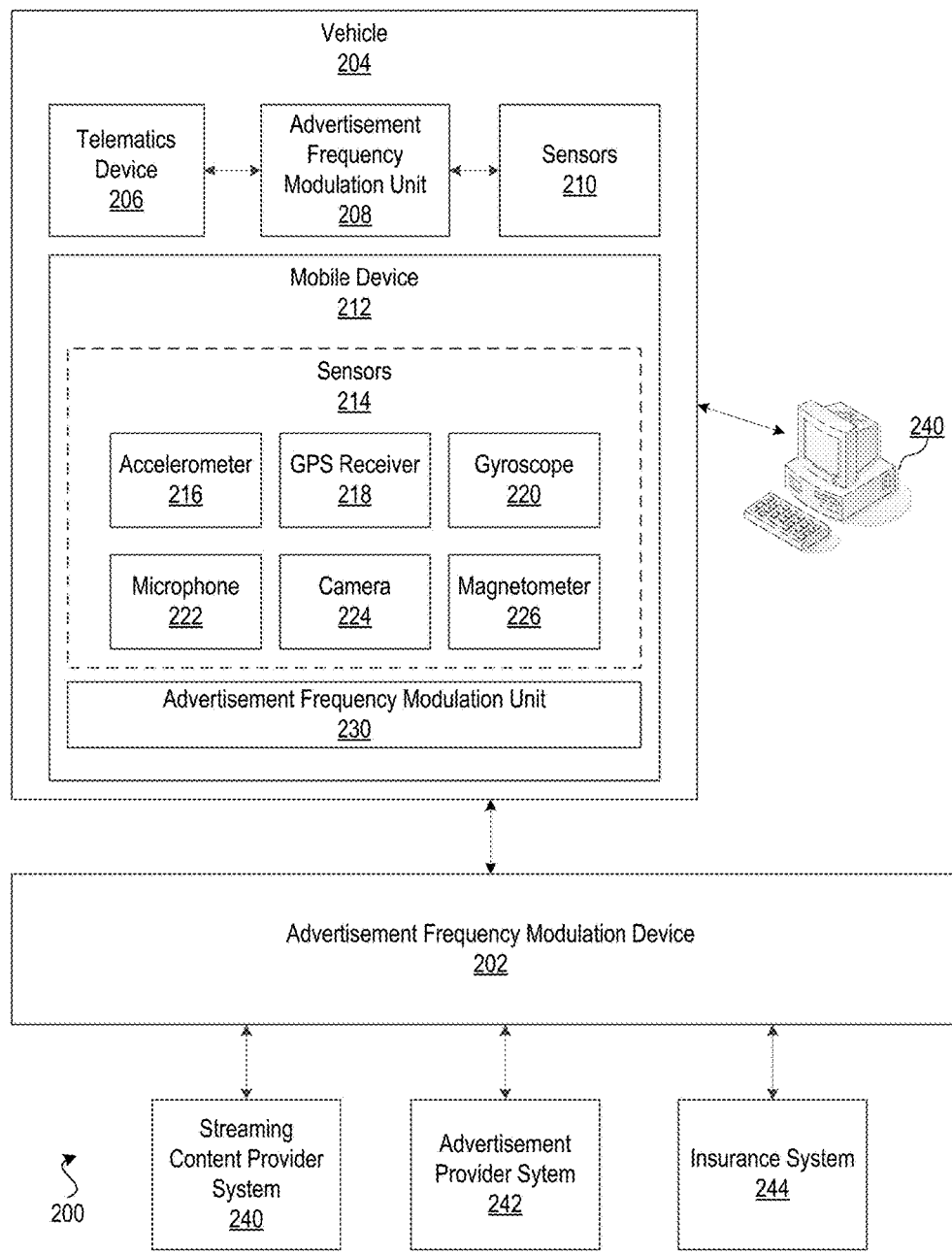
FIG. 2 is a block diagram illustrating various components and devices associated with an example advertisement frequency rewards system, according to one or more aspects of the disclosure.

FIG. 2 is an illustration of an example implementation of an advertisement frequency rewards system 200. The advertisement frequency rewards system 200 may be similar to and/or may include some or all of the components of the advertisement frequency rewards system 100 in FIG. 1. The system 200, in this example, includes an advertisement frequency modulation device 202. The advertisement frequency modulation device 202, described in further detail below, adjust the frequency of advertisements in a streaming signal (i.e., the rate of occurrence of advertisements in the streaming signal) based on vehicle operation data. The advertisement frequency modulation device 202 may be similar to and/or may include some or all of the components of the advertisement frequency modulation system 101 in FIG. 1. In some examples, the advertisement frequency modulation device 202 may determine a risk score based on sensor data received from a vehicle or one or more mobile devices associated with the vehicle, where the risk score may be used to determine an advertisement tier associated with the driver of the vehicle.

The example advertisement frequency rewards system 200 may contain some or all of the hardware/software components as the advertisement frequency rewards system 100 depicted in FIG. 1. The advertisement frequency modulation device 202 is a special-purpose computing device that is configured to receive a streaming signal from one or more external systems (e.g., a streaming content provider system 240). The one or more external systems may, in some examples, be associated with an insurance system 244. In some examples, the advertisement frequency modulation device 202 may receive streaming signals from the streaming content provider system 240 in real-time or in near real-time. The streaming signal may be a music streaming signal and/or a video streaming signal. In some examples, the streaming signal may be played via a speaker installed in or otherwise connected to the mobile device 212. The streaming signal may also be played via a speaker installed in or otherwise connected to the vehicle 204, where the mobile device 212 and the vehicle 204 are connected using a short-range communication protocol (e.g., Bluetooth).

The advertisement frequency modulation device 202 may further be configured to inject advertisement content at specified frequencies (e.g., every 1 minute, every 5 minutes, after 3 songs played, etc.) into the streaming signal. In some examples, the advertisement frequency modulation device 202 may be configured to retrieve advertisement content from one or more external systems (e.g., an advertisement provider system 242). The advertisement frequency modulation device 202 may retrieve advertisement content from the advertisement provider system 242 based on one or more parameters, including a risk score associated with the vehicle 204, and/or one or more contextual attributes (e.g., driver's age, vehicle's destination, vehicle's current location, etc.).

The advertisement frequency modulation device 202 may additionally be configured to receive sensor data from a mobile device 212 located within a vehicle 204. The advertisement frequency modulation device 202 may initiate communication with, retrieve data from, or receive sensor data (e.g., signals) from one or more sensors within a mobile device 212 wirelessly over one or more computer networks (e.g., the Internet), where the mobile device 212 is located within a vehicle 204. The advertisement frequency modulation device 202 may also be configured to receive driving data from a vehicle 204 wirelessly via telematics device 206, or by way of separate computing systems (e.g., computer 240) over one or more computer networks (e.g., the Internet). Further, the advertisement frequency modulation device 202 may be configured to receive driving vehicle-related data from one or more third-party telematics systems or non-vehicle data sources, such as external traffic databases containing traffic data (e.g., amounts of traffic, average driving speed, traffic speed distribution, and numbers and types of accidents, etc.) at various times and locations, external weather databases containing weather data (e.g., rain, snow, sleet and hail amounts, temperatures, wind, road conditions, visibility, etc.) at various times and locations, and other external data sources containing driving hazard data (e.g., road hazards, traffic accidents, downed trees, power outages, construction zones, school zones, and natural disasters, etc.).

A mobile device 212 in the advertisement frequency rewards system 200 may be, for example, any mobile device, such as a smartphone, tablet computing device, personal digital assistant (PDA), smart watch, netbook, laptop computer, and other like devices found within a vehicle 204. As used herein, a mobile device 212 "within" the vehicle 204 includes mobile devices that are inside of or otherwise secured to a vehicle, for instance, in the cabins of a vehicle. The mobile device 212 includes a set of mobile device sensors 214, which may include, for example, an accelerometer 216, a GPS receiver 218, a gyroscope 220, a microphone 222, a camera 224, and a magnetometer 226. The mobile device sensors 214 may be capable of detecting and recording various conditions at the mobile device 112 and operational parameters of the mobile device 112. For example, sensors 214 may detect and store data corresponding to the mobile device's location (e.g., GPS coordinates), speed and direction in one or multiple axes (forward and back, left and right, and up and down for example), rate and direction of acceleration or deceleration, specific instances of sudden acceleration, deceleration, lateral movement, and other data which may be indicative of safe or risky driving behaviors. Additional sensors 214 may include audio sensors, video sensors, signal strength sensors, communication network-presence sensors, ambient light sensors, temperature/humidity sensors, and/or barometer sensors, which may be used to, for example, listen to audio signals indicating a door locking/unlocking, door chime, or vehicle ignition, sensing light from an overhead or dashboard light, detecting a temperature or humidity change indicative of entering a vehicle, and/or detecting a presence of a network or communication device associated with a vehicle (e.g., a BLUETOOTH transceiver associated with a vehicle).

Software applications executing on mobile device 212 may be configured to detect certain driving data independently using mobile device sensors 214. For example, mobile device 212 may be equipped with sensors 214, such as an accelerometer 216, a GPS receiver 218, a gyroscope 220, a microphone 222, a camera 224, and/or a magnetometer 226, and may determine vehicle location, speed, acceleration/deceleration, direction and other basic driving data without needing to communicate with the vehicle sensors 210, or any vehicle system. In other examples, software on the mobile device 212 may be configured to receive some or all of the driving data collected by vehicle sensors 210.

Additional sensors 214 may detect and store external conditions. For example, audio sensors and proximity sensors 214 may detect other nearby mobile devices, traffic levels, road conditions, traffic obstructions, animals, cyclists, pedestrians, and other conditions that may factor into a braking event data analysis.

Data collected by the mobile device sensors 214 may be stored, processed, and/or analyzed within the mobile device 212, and/or may be transmitted to one or more external devices for processing, analysis, and the like. For example, as shown in FIG. 2, sensor data collected by the mobile device sensors 214 may be transmitted to an advertisement frequency modulation device 202. In some examples, the data collected by the mobile device sensors 214 may be stored, processed, and/or analyzed at the vehicle 204 by an on-board computing device in the vehicle or by the mobile device 212, and/or may be transmitted to one or more external devices (e.g., an insurance system 244). For example, sensor data may be exchanged (uni-directionally or bi-directionally) between vehicle 204 and mobile device 212.

Data may be transmitted between the mobile device 212 and the vehicle 204 via wireless networks, including those discussed above, or short-range communication systems. Short-range communication systems are data transmission systems configured to transmit and receive data between nearby devices. In this example, short-range communication systems may be used to transmit sensor data to other nearby mobile devices and/or vehicles, and to receive sensor data from other nearby mobile devices and/or vehicles. Short-range communication systems may be implemented using short-range wireless protocols such as WLAN communication protocols (e.g., IEEE 802.11), Bluetooth (e.g., IEEE 802.15.1), or one or more of the Communication Access for Land Mobiles (CALM) wireless communication protocols and air interfaces. The transmissions between the short-range communication systems may be sent via Bluetooth, satellite, GSM, infrared, IEEE 802.11, WiMAX, RFID, and/or any suitable wireless communication media, standards, and protocols. In certain systems, short-range communication systems may include specialized hardware installed in vehicle 204 and/or mobile device 212 (e.g., transceivers, antennas, etc.), while in other examples the communication systems may be implemented using existing hardware components (e.g., radio and satellite equipment, navigation computers) or may be implemented by software running on the mobile device 212 and/or on an on-board computing device within the vehicle 204.

The vehicle 204 may be, for example, an automobile, motorcycle, scooter, bus, recreational vehicle, boat, bicycle, or other vehicle in which a mobile device may be located. The vehicle 204 may include one or more sensors 210, which are capable of detecting and recording various conditions at the vehicle and operating parameters of the vehicle. For example, the sensors 210 may detect, transmit, or store data corresponding to the vehicle's location (e.g., GPS coordinates), speed and direction, rate and direction of acceleration, deceleration, and/or may detect transmit specific instances of sudden acceleration, sudden deceleration, and swerving. The sensors 210 may also detect, transmit, or store data received from the vehicle's internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's computer systems. Thus, in some examples, the advertisement frequency modulation device 202 may acquire information about the vehicle 204 directly from the vehicle 204.

Additional sensors 210 may detect and store the external driving conditions, for example, external temperature, rain, snow, light levels, and sun position for driver visibility. Additional sensors 210 may also detect and store data relating to compliance with traffic laws and the observance of traffic signals and signs. Additional sensors 210 may further detect and store data relating to the maintenance of the vehicle 204, such as the engine status, oil level, engine coolant temperature, odometer reading, the level of fuel in the fuel tank, engine revolutions per minute (RPMs), tire pressure, or combinations thereof.

The vehicle 204 may also include cameras or proximity sensors 210 capable of recording additional conditions inside or outside of the vehicle 204. For example, internal cameras 210 may detect conditions such as the number of passengers and the types of passengers (e.g., adults, children, teenagers, handicapped, etc.) in the vehicles, and potential sources of driver distraction within the vehicle (e.g., pets, phone usage, unsecured objects in the vehicle). Sensors 210 also may be configured to collect data a driver's movements or the condition of a driver. For example, the vehicle 204 may include sensors 210 that monitor a driver's movements, such as the driver's eye position and/or head position, etc. Additional sensors 210 may collect data regarding the physical or mental state of the driver, such as fatigue or intoxication. The condition of the driver may be determined through the movements of the driver or through other sensors, for example, sensors that detect the content of alcohol in the air or blood alcohol content of the driver, such as a breathalyzer. Further, the vehicle 204 may include sensors 210 that are capable of detecting other nearby vehicles, traffic levels, road conditions, traffic obstructions, animals, cyclists, pedestrians, and other conditions that may factor into an analysis of vehicle telematics data. Certain vehicle sensors 210 also may collect information regarding the driver's route choice, whether the driver follows a given route, and to classify the type of trip (e.g., commute, errand, new route, etc.). A Global Positioning System (GPS), locational sensors positioned inside the vehicle 204, and/or locational sensors or devices external to the vehicle 204 may be used determine the route, trip type (e.g., commute, errand, new route, etc.), lane position, and other vehicle position or location data.

The data collected by the vehicle sensors 210 may be stored or analyzed within the respective vehicle 204 by an on-board computing device or mobile device 212, or may be transmitted to one or more external devices. For example, as shown in FIG. 2, sensor data may be transmitted to an advertisement frequency modulation device 202, which may be a collection of special-purpose computing devices that are interconnected and in signal communication with each other. The special-purpose computing devices may be programmed with a particular set of instructions that, when executed, perform functions associated with processing the sensor data to calculate a risk score, determining an advertisement tier, selecting an advertisement, and modifying a streaming signal to inject the selected advertisement based on the determined advertisement tier. As such, an advertisement frequency modulation device 202 may be a separate special-purpose computing device or may be integrated into one or more components within the vehicle 204, such as the telematics device 206, or in the internal computing systems (e.g., on-board vehicle computing device) of the vehicle 204. Additionally, the sensor data may be transmitted as vehicle telematics data via a telematics device 206 to one or more remote computing devices, such as an advertisement frequency modulation device 202. A telematics device 206 may be a computing device containing many or all of the hardware/software components as the advertisement frequency modulation system 101 depicted in FIG. 1. As discussed above, the telematics device 206 may receive vehicle telematics data from vehicle sensors 210, and may transmit the data to one or more external computer systems (e.g., an insurance system 244) over a wireless network. Telematics devices 206 also may be configured to detect or determine additional types of data relating to real-time driving and the condition of the vehicle 204. In certain embodiments, the telematics device 206 may contain or may be integral with one or more of the vehicle sensors 210. The telematics device 206 may also store the type of the vehicle 204, for example, the make, model, trim (or sub-model), year, and/or engine specifications, as well as other information such as vehicle owner or driver information, insurance information, and financing information for the vehicle 204.

In the example shown in FIG. 2, the telematics device 206 may receive vehicle telematics data from vehicle sensors 210, and may transmit the data to an advertisement frequency modulation device 202. However, in other examples, one or more of the vehicle sensors 210 may be configured to transmit data directly to an advertisement frequency modulation device 202 without using a telematics device 206. For instance, a telematics device 206 may be configured to receive and transmit data from certain vehicle sensors 210, while other sensors may be configured to directly transmit data to an advertisement frequency modulation device 202 without using the telematics device 206. Thus, telematics devices 206 may be optional in certain embodiments.

In certain embodiments, the mobile device 212 within the vehicle 204 may be programmed with instructions to collect vehicle telematics data from the telematics device 206 or from the vehicle sensors 210, and then to transmit the vehicle telematics data to the advertisement frequency modulation device 202 and other external computing devices. For example, the mobile device 212 may transmit the vehicle telematics data directly to an advertisement frequency modulation device 202, and thus may be used in conjunction with or instead of the telematics device 206. Moreover, the processing components of the mobile device 212 may be used to receive a streaming signal, collect and analyze sensor data and/or vehicle telematics data to calculate a risk score, determine an advertisement tier based on the risk score, select advertisement content, modify the streaming signal to inject the selected advertisement content based on the advertisement tier, and perform other related functions. Therefore, in certain embodiments, the mobile device 212 may be used in conjunction with or instead of the advertisement frequency modulation system unit 208.

The vehicle 204 may include an advertisement frequency modulation system 208, which may be a separate computing device or may be integrated into one or more other components within the vehicle 204, such as the telematics device 206, the internal computing systems of the vehicle 204, and/or the mobile device 212. In some examples, the mobile device 212 may include an advertisement frequency modulation unit 230 which may be a device separate and independent from the advertisement frequency modulation unit 208 of the vehicle 204, such as an improved media streaming device. The advertisement frequency modulation units 208 and 230 may alternatively be implemented by computing devices separate and independent from the vehicle 204 and the mobile device 212, such as one or more computer systems 240. In any of these examples, the advertisement frequency modulation units 208 and 230 may contain some or all of the hardware/software components as the advertisement frequency modulation system 101 depicted in FIG. 1.

The advertisement frequency modulation units 208 and 230 may be implemented in hardware and/or software configured to receive sensor data from the vehicle sensors 210 and the mobile device sensors 214 respectively, and/or other vehicle telematics data sources. The advertisement frequency modulation unit 208 may further be configured to receive sensor data from a telematics device 206. After receiving the sensor data and vehicle telematics data, the advertisement frequency modulation units 208 and 230 may process the sensor data and vehicle telematics data, and analyze the sensor data and vehicle telematics data to calculate a risk score. One or more notifications including feedback may be generated based on a calculation of a risk score to the mobile device 212 or vehicle 204.

Further, in certain implementations, the functionality of the advertisement frequency modulation units 208 and 230, such as receiving a streaming signal, collecting and analyzing sensor data, calculating a risk score based on the sensor data, determining an advertisement tier, selecting advertisement content, and modifying the streaming signal to inject the advertisement content based on the advertisement tier, may be performed in an advertisement frequency modulation device 202 rather than by the individual vehicle 204 or mobile device 212. In such implementations, the vehicle 204 or mobile device 212 may only collect and transmit sensor data to an advertisement frequency modulation device 202, and thus the advertisement frequency modulation units 208 and 230 may be optional. Thus, in various examples, the analyses and actions performed within the advertisement frequency modulation units 208 and 230 may be performed entirely within the advertisement frequency modulation units 208 and 230, entirely within the advertisement frequency modulation device 202, or in some combination of the two. Additional arrangements, as well as detailed descriptions and examples of the analyses that may be performed by the advertisement frequency modulation units 208 and 230 and/or by the advertisement frequency modulation device 202 are described below.

Figure 3:
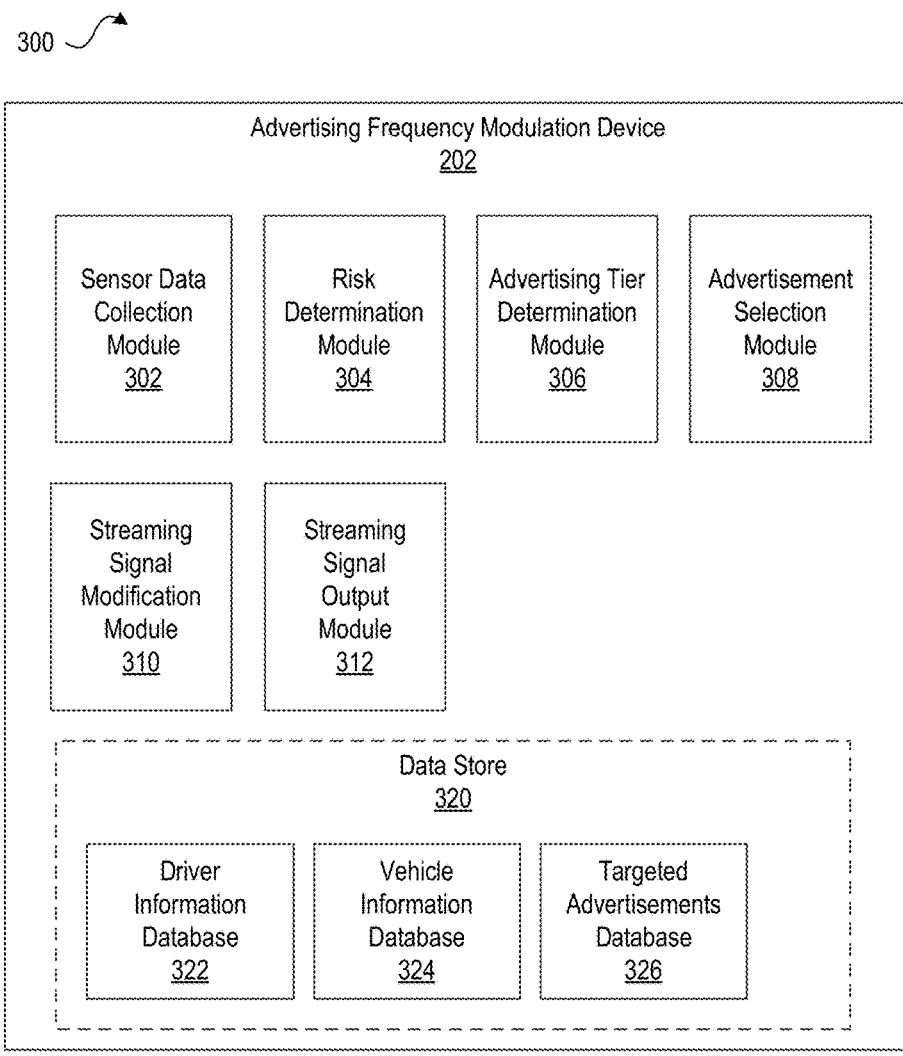
FIG. 3 is a block diagram of an example of an implementation of an advertisement frequency modulation device, according to one or more aspects of the disclosure.

FIG. 3 shows an example implementation of an advertisement frequency modulation device 202. In some example implementations, the advertisement frequency modulation device 202 is a special-purpose computing device programmed with instructions, that when executed, perform functions associated with receiving a streaming signal, collecting or receiving sensor data from mobile devices and vehicles, determining a risk score based on the sensor data, determining an advertisement tier based on the risk score, select advertisement content, and modifying the streaming signal to inject the advertisement content based on the determined advertisement tier. In these example implementations, the units 302-312 of the advertisement frequency modulation device 202 correspond to particular sets of instructions embodied as software programs residing at the advertisement frequency modulation device 202. In other example implementations, the advertisement frequency modulation device 202 is a collection of special-purpose computing devices that are interconnected and in signal communication with each other. In these examples, each unit or device 302-312 of the advertisement frequency modulation device 202 respectively corresponds to a special-purpose computing device programmed with a particular set of instructions, that, when executed, perform respective functions associated with receiving a streaming signal, collecting or receiving sensor data from mobile devices and vehicles, determining a risk score based on the sensor data, determining an advertisement tier based on the risk score, select advertisement content, and modifying the streaming signal to inject the advertisement content based on the determined advertisement tier. Such special-purpose computing devices may be, for example, application servers programmed to perform the particular set of functions.

The advertisement frequency modulation device 202, in this example, includes various modules, units and databases that facilitate receiving a streaming signal, collecting or receiving sensor data from mobile devices and vehicles, determining a risk score based on the sensor data, determining an advertisement tier based on the risk score, select advertisement content, and modifying the streaming signal to inject the advertisement content based on the determined advertisement tier. It will be appreciated that the advertisement frequency modulation device 202 illustrated in FIG. 3 is shown by way of example, and that other implementations of a advertisement frequency modulation device may include additional or alternative modules, units, devices, and/or databases without departing from the scope of the claimed subject matter. In this example, the advertisement frequency modulation device 202 includes a sensor data collection module 302, a risk determination module 304, an advertisement tier determination module 306, an advertisement selection module 308, a streaming signal modification module 310, a streaming signal output module 312, and a data store 320. Each module may include hardware and/or software configured to perform various functions within the advertisement frequency modulation device 202. Further, each module may be a separate and distinct computing device or one or more modules may be integrated into a single computing device.

The data store 320 may store information relating to the driver of the vehicle 204, information relating to the vehicle 204, and/or information relating to advertisement content to be injected into a streaming signal. For example, the data store 320 may include a driver information database 322, a vehicle information database 324, and a targeted advertisements database 326. It will be appreciated that in other examples, the data store 320 may include additional and/or alternative databases.

The driver information database 322 may store information associated with drivers of the vehicles 204 (e.g., name of driver, contact information, one or more associated mobile devices, one or more associated vehicles, etc.). In some examples, the driver information database 322 may also store the driver's affiliation with one or more insurance providers.

The vehicle information database 324 may store information associated with the vehicles 204 (e.g., make, model, mileage, last maintenance date, accident reports, etc.).

The targeted advertisements database 326 may store information associated with a plurality of advertisements which may be injected into a streaming signal. In some examples, some or all of the plurality of advertisements may be associated with one or more characteristics (e.g., subject of advertisement, duration of advertisements, age of intended audience, etc.). As such, the advertisement frequency modulation device 202 may query the targeted advertisements database 326 to retrieve advertisements based on information relating to the driver of the vehicle 204, information relating to the vehicle 204, and so forth.

Figure 4:
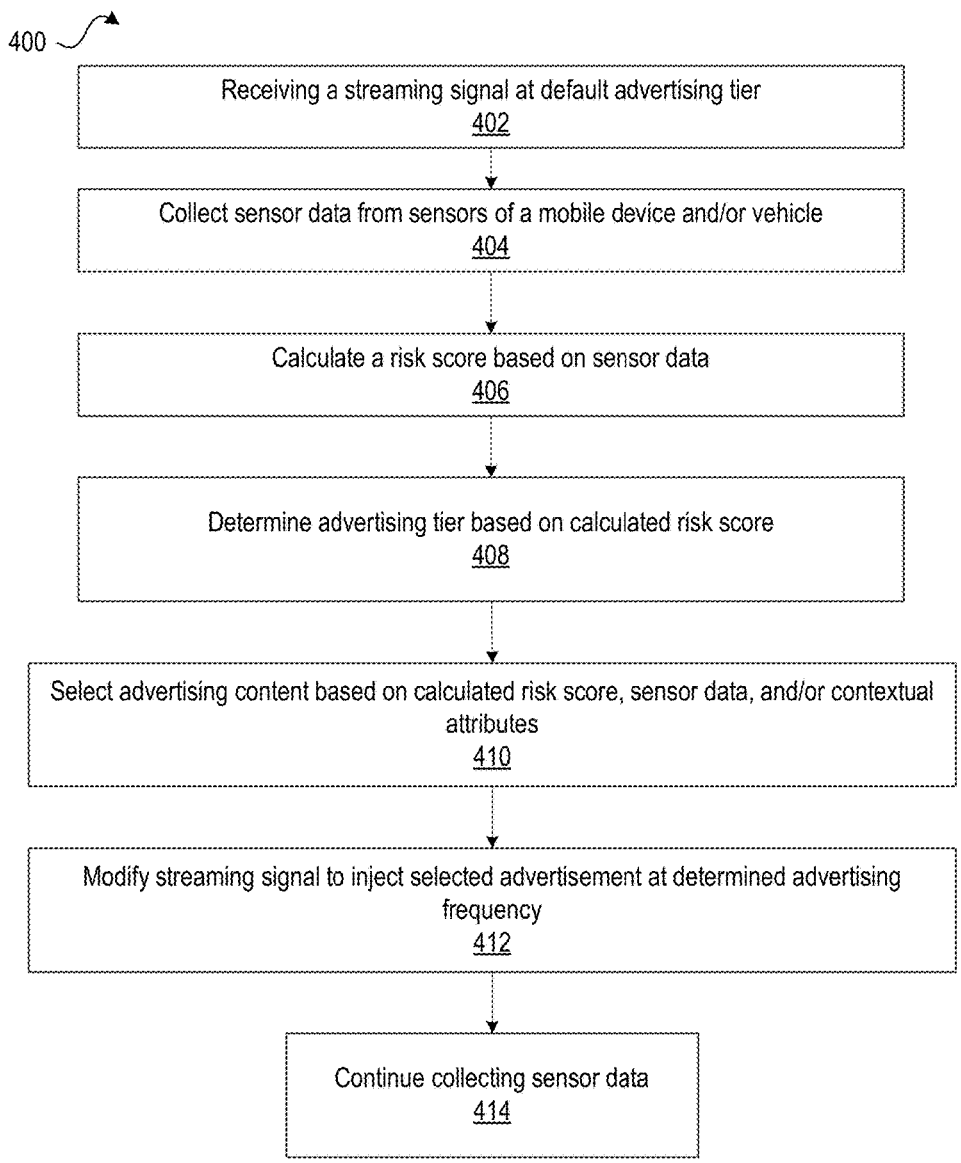
FIG. 4 is a flowchart of example method steps for initiating a streaming signal, collecting and analyzing sensor data, calculating a risk score, determining an advertisement level, selecting an advertisement, and modifying a streaming signal to inject advertisements, according to one or more aspects of the disclosure.

FIG. 4 is a flowchart 400 of example steps for initiating a streaming signal, collecting and analyzing sensor data, calculating a risk score, determining an advertisement level, selecting an advertisement, and modifying a streaming signal to inject advertisement, according to one or more aspects described herein. The various components of the advertisement frequency modulation device 202 and/or the advertisement frequency modulation unit 230 of the mobile device 212 may be used to perform these method steps.

In step 402, the advertisement frequency modulation device 202 may receive a streaming signal from a streaming content provider system 240. In some examples, the streaming signal may be associated with a default advertisement tier. The default advertisement tier may specify a baseline advertisement frequency at which to include advertisements in the streaming signal. Thus, in some examples, the streaming signal received in step 402 may include no advertisements. In other examples, the streaming signal received in step 402 may include advertisements at a default frequency (e.g., every 1 minute, every 5 minutes, every 3 songs, every 1 video, etc.). In further examples, the streaming signal received in step 402 may include markers indicating starting times at which advertisements may be injected. In some examples, the streaming signal may include default advertisements (or non-essential content) starting at the markers. Non-essential content may advantageously be used to reserve time for advertisements in examples where the streaming signal is modified in real time (or in near real-time) to inject advertisements.

In step 404, the sensor data collection module 302 may receive sensor data from the one or more sensors 214 installed at, attached to, and/or remotely located relative to the mobile device 212. In some examples, the mobile device 212 may collect sensor data from the one or more sensors 214 and transmit the sensor data to the advertisement frequency modulation device 202 in real-time or near real-time. As such, the mobile device 212 may broadcast the sensor data from the one or more sensors 214, transmit the sensor data to the advertisement frequency modulation unit 230 in real-time, and the advertisement frequency modulation unit 230 may transmit the sensor data to the advertisement frequency modulation device 202. The advertisement frequency modulation unit 230 may or may not transmit the sensor data to the advertisement frequency modulation device 202 in real-time. For instance, the advertisement frequency modulation unit 230 may begin to collect sensor data from the one or more sensors 214, and wait to transmit sensor data from the one or more sensors 214 until the advertisement frequency modulation unit 230 has collected data for a window of time (e.g., 5 seconds, 30 seconds, 1 minute, etc.). In another example, the advertisement frequency modulation unit 230 may transmit sensor data to the advertisement frequency modulation device 202 in response to a request from the advertisement frequency modulation device 202 to collect and transmit sensor data associated with a window of time. As such, the advertisement frequency modulation unit 230 advantageously limits and/or controls the number of transmissions between the mobile device 212 and the advertisement frequency modulation device 202. Examples of sensor data collected in step 404 from the sensors 214 of the mobile device 212 may include acceleration from the accelerometer 216, location from the GPS receiver 218, rotational motion from the gyroscope 220, sound from the microphone 222, movement from the camera 224, and magnetization from the magnetometer 226. Further, as mentioned above, the sensor data may also include data received from sensors 210 of the vehicle 204, and/or data received from third-party sources (e.g., traffic data, weather data, etc.).

In certain embodiments, in addition to the sensor data obtained from the sensors 214 of the mobile device 212, the sensor data collection module 302 may collect and process sensor data from the sensors 210 of the vehicle 204. The sensor data from the sensors 210 of the vehicle 204 may be used to supplement the sensor data from the sensors 214 of the mobile device 212 as desired. The additional data may be beneficial in providing increased accuracy in vehicle telematics data. For example, where signal communication with the mobile device 212 is lost, the sensor data collection module 302 may collect and process sensor data from the sensors 210 of the vehicle 204.

In step 406, the risk determination module 304 may calculate a risk score based on the collected sensor data. In some examples, the risk score may be based on a plurality of factors, including the speed of the vehicle (e.g., the minimum/maximum speed during the window of time, the average speed during the window of time, etc.), the rate of acceleration or deceleration of the vehicle, road type (e.g., city street, highway, etc.), weather, time of day, known or unknown route, and phone type (e.g., make and model of mobile device 212). In some examples, risk determination module 304 may assign a score for each factor. For instance, the risk determination module 304 may be configured such that a higher score is assigned to a maximum speed of the vehicle above a predetermined value during the window of time, whereas a lower score is assigned to a maximum speed of the vehicle above the predetermined value during the window of time. In a further example, the risk determination module 304 may be configured such that a higher score is assigned to driving in rainy or snow weather conditions, whereas a lower score is assigned to driving in dry weather conditions. It will be appreciated that the risk determination module 304 may be similarly configured for other factors utilized to calculate a risk score.

Once each factor is assigned a score, the risk determination module 304 may apply a risk calculation equation to determine the risk score. An example risk calculation equation may be:

$$\text{risk score} = \text{factor}[1].\text{score} + \text{factor}[2].\text{score} + \ldots + \text{factor}[n].\text{score}$$

where factor[1].score . . . factor[n].score are the respective scores assigned to each factor. In some examples, the scores assigned to each factor may be weighted by the risk calculation equation. An example weighted risk calculation equation may be:

$$\text{risk score} = (\text{factor}[1].\text{score} \times \text{weight}[1]) + (\text{factor}[2].\text{score} \times \text{weight}[2]) + \ldots + (\text{factor}[n].\text{score} \times \text{weight}[n])$$

where weight[1] . . . weight[n] are the weights respectively associated with factor[1] . . . factor[n].

It will be appreciated that additional or alternative mathematical operations may be selectively employed to aggregate the scores for each factor. It will also be appreciated that the risk determination module 304 may be configured to apply one or more risk calculation equations that respectively use different factors with different assigned scores and/or weights. For example, the risk determination module 304 may be configured to use one risk calculation equation for a driver associated with a first company, and a second risk calculation equation for a driver associated with a second insurance company.

In some examples, the risk determination module 304 may calculate a risk score based on sensor data collected over a window of time (e.g., 5 seconds, 30 seconds, 1 minute, etc.). In other examples, the risk determination module 304 may recalculate the risk score as sensor data is received in real time or in near real-time.

In step 408, the advertisement tier determination module 306 may determine an advertisement tier based on the calculated risk score. The advertisement tier may be used by the advertisement frequency modulation device 202 to determine the frequency in which to inject advertisements into the streaming signal received in step 402. As such, the advertisement frequency modulation device 202 may be configured to support one or more advertisement tiers. For example, for a higher advertisement tier, the advertisement frequency modulation device 202 may inject advertisements at a higher frequency (e.g., every 1 minute, every 1 song, etc.). In contrast, for a lower advertisement tier, the advertisement frequency modulation device 202 may inject advertisements at a lower frequency (e.g., every 5 minutes, every 3 songs, etc.). Thus, the advertisement tier selected by the advertisement tier determination module 306 based on the calculated risk score may instruct the advertisement frequency modulation device 202 to inject advertisements at a higher or lower frequency than prescribed by the default advertisement level.

In some examples, the advertisement tiers may be configured based on the amount of revenue needed to support a particular frequency of advertisements in a streaming signal, and increase in driver safety. Additionally or alternatively, the advertisement tiers may be configured based on Weber's Law for calculating a just noticeable difference (JND). As such, the difference between a frequency associated with a lower advertisement tier and a frequency associated with a higher advertisement frequency may be a JND.

In some examples, each advertisement tier may be associated with a predetermined threshold risk score. As such, the advertisement tier determination module 306 may compare the calculated risk scores with one or more determined threshold risk scores associated with one or more advertisement tiers. Based on these comparisons, the advertisement tier determination module 306 may select the highest applicable advertisement tier. For instance, where Advertisement Tier 1 is associated with a predetermined threshold risk score of Risk Score 1, Advertisement Tier 2 is associated with a predetermined threshold risk score of Risk Score 2, and Advertisement Tier 3 is associated with a predetermined threshold risk score of Risk Score 3, the advertisement tier determination module 306 may compare the calculated risk score from step 406 with Risk Score 1, Risk Score 2, Risk Score 3. Where the advertisement tier determination module 306 determines that the calculated risk score is greater than Risk Score 3, the advertisement tier determination module 306 may assign Advertisement Tier 3 to the mobile device 212 and/or the vehicle 204. Where the advertisement tier determination module 306 determines that the calculated risk score is lesser than Risk Score 3, but higher than Risk Score 2, the advertisement tier determination module 306 may assign Advertisement Tier 2 to the mobile device 212 and/or the vehicle 204. Where the advertisement tier determination module 306 determines that the calculated risk score is lesser than Risk Score 2, but higher than Risk Score 1, the advertisement tier determination module 306 may assign Advertisement Tier 1 to the mobile device 212 and/or vehicle 204. In examples where the calculated risk score falls below the predetermined threshold risk scores of all of the advertisement tiers, the advertisement tier determination module 306 may assign the default advertisement tier to the mobile device 212 and/or the vehicle 204. Alternatively, in such examples, the advertisement tier determination module 306 may assign the lowest advertisement tier (e.g., Advertisement Tier 1) to the mobile device 212 and/or the vehicle 204.

The advertisement tier may be associated with the mobile device 212 and/or the vehicle 204. In examples where the advertisement tier is associated with the mobile device 212, the advertisement tier determined in step 408 will be applied to all streaming signals received by the mobile device 212. As such, the advertisement tier determined in step 408 will be applied regardless of whether the mobile device 212 is receiving the streaming signal within a vehicle or not. Thus, where the advertisement frequency modulation device 202 first determines an advertisement tier associated with the mobile device 212 while the mobile device 212 is receiving a streaming signal inside a vehicle 204, the determined advertisement tier may continue to apply even after the mobile device 212 is no longer within the vehicle 204.

In other examples where the advertisement tier is associated with the vehicle 204, the advertisement tier determined in step 408 will be applied to all streaming signals received within the vehicle 204. As such, the advertisement tier determined in 408 will be applied regardless of the mobile device used to receive the streaming signal within the vehicle 204.

Further, in some examples, the advertisement tier may be associated with a duration (e.g., 1 hour, 5 hours, 3 days, 1 month, etc.) or an event (e.g., a trip, 3 trips, etc.). As such, the advertisement tier determined in step 408 may expire after an expiry duration has terminated, or after the specified event has occurred. For instance, the advertisement tier determined in step 408 may expire after 1 hour. In some examples, the expiry duration may be based on the trip duration of the vehicle 204, such that a longer trip duration may result in a longer expiry duration. For instance, a 5-hour trip in the vehicle 204 may be associated with an expiry duration of 2 hours, whereas a 1-hour trip in the vehicle 204 may be associated with an expiry duration of 45 minutes.

In such examples, the expiry of the advertisement tier determined in step 408 may cause the mobile device 212 and/or the vehicle to be associated with the default advertisement tier. As such, the advertisement frequency modulation device 202 may re-determine an advertisement tier when the mobile device 212 resumes receipt of a streaming signal.

In step 410, the advertisement selection module 308 may select advertisement content based on one or more characteristics, including the subject matter or topic of the advertisement, the duration of the advertisement, the risk score calculated in step 406, other sensor data collected in step 404, and/or contextual attributes relating to the vehicle and/or the driver. For instance, the advertisement selection module 308 may be configured to retrieve advertisements of a particular duration (e.g., 10 seconds, 30 seconds, etc.). In some cases, the duration of the selected advertisement may be based on the advertisement tier determined in step 408. As such, the advertisement selection module 308 may retrieve a longer advertisement (e.g., 30 seconds) for a higher advertisement tier and a shorter advertisement (e.g., 10 seconds) for a lower advertisement tier. The advertisement selection module 308 may also be configured to retrieve advertisements by subject matter or topic. For instance, the advertisement selection module 308 may select an advertisement (e.g., a public service announcement, etc.) directed at the vehicle's 204 most recent risky behavior (e.g., speeding, hard braking, no seat belt use, etc.). In yet other examples, the advertisement selection module 308 may be configured to retrieve advertisements based on characteristics of the driver and/or the vehicle. For instance, the advertisement selection module 308 may select advertisements based on the driver's age and/or the vehicle's make/model. In another example, the advertisement selection module 308 may be configured to retrieve advertisements based on the vehicle's 204 destination. For instance, where the destination is a hospital, the advertisement selection module 308 may select a medical advertisement, but where the destination is a grocery store, the advertisement selection module 308 may select a shopping advertisement.

In some examples, the advertisement selection module 308 may retrieve one or more advertisements from the targeted advertisements database 326. For instance, the advertisement selection module 308 may query the targeted advertisements database 326 to retrieve one or more advertisements having one or more characteristics. In other examples, the advertisement selection module 308 may retrieve one or more advertisements from one or more external systems (e.g., an advertisement provider system 242).

In step 412, the streaming signal modification module 310 may modify the streaming signal to inject the selected advertisements based on the advertisement tier.

Figure 5:
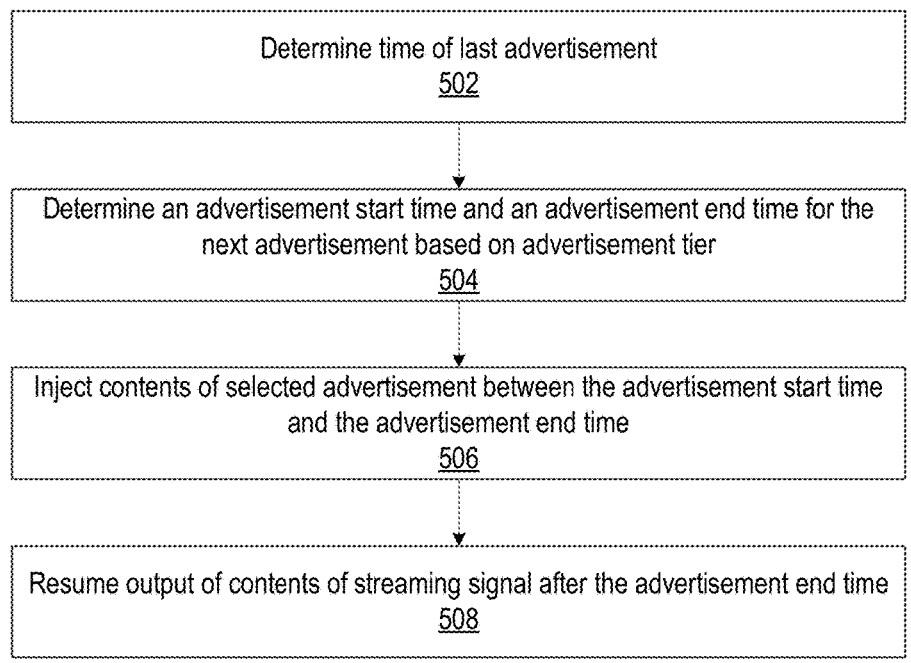
FIG. 5 is a flowchart of example method steps for modifying a streaming signal to inject a selected advertisement at a determined advertisement frequency, according to one or more aspects of the disclosure.

Referring now to FIG. 5, a flowchart 500 of example method steps for modifying a streaming signal to inject a selected advertisement at a determined advertisement frequency is shown. The steaming signal modification module 310 of the advertisement frequency modulation device 202 and/or of the advertisement frequency modulation unit 230 may be used to perform these method steps.

In step 502, the streaming signal modification module 310 may determine a time of the last advertisement. The last advertisement may be an advertisement that was included as part of the current streaming signal based on the default advertisement tier, or may have been injected by the advertisement frequency modulation device 202 in to the current streaming signal. The streaming signal modification module 310 may represent the time of the last advertisement as a timestamp (e.g., hh:mm:ss, etc.). In examples where no advertisements have been presented at step 502 (e.g., new streaming signals, streaming signals with default advertisement tier having no advertisements, etc.), the streaming signal modification module 310 may determine the time of the last advertisement to be a zero timestamp (e.g., 00:00:00, etc.).

In step 504, the streaming signal modification module 310 may determine an advertisement start time and an advertisement end time for the next advertisement based on the advertisement tier determined in step 408. The streaming signal modification module 310 may determine the advertisement start time based on the advertisement tier determined in step 408. For instance, where the advertisement tier prescribes injecting an advertisement every 1 minute, the streaming signal modification module 310 may determine that the advertisement start time is 1 minute past the timestamp of the last advertisement. In another example, where the advertisement tier prescribes injecting an advertisement every 1 song, the streaming signal modification module 310 may determine the advertisement start time based on the timestamp at the end of the current song. In some examples, the streaming signal may include a marker indicating the beginning and end of songs, and as such, the streaming signal modification module 310 may parse the streaming signal to detect the start and end markers. The streaming signal modification module 310 may then determine the advertisement end time based on the advertisement start time and the duration of the advertisement selected in step 410. As such, the streaming signal modification module 310 may determine the advertisement end time by adding the duration of the advertisement to the advertisement start time.

In step 506, the streaming signal modification module 310 may inject the contents of the streaming signal with the contents of the selected advertisement between the advertisement start time and the advertisement end time. As such, the streaming signal output module 312 may cause the mobile device 212 to output the contents of the selected advertisement between the advertisement start time and the advertisement end time, instead of the contents of the original streaming signal. Thus, between the advertisement start time and the advertisement end time, the streaming signal modification module 310 may substitute the contents of the selected advertisement for the contents of the original streaming signal. In some examples, the streaming signal modification module 310 may perform the injection of the selected advertisement in real-time or in near real-time for one data point at a time.

Alternatively, the streaming signal modification module 310 may pause receiving the streaming signal in real-time for the duration of the selected advertisement. In these examples, the streaming signal output module 312 may cause the mobile device 212 to output the contents of the selected advertisement between the advertisement start time and the advertisement end time while the real-time streaming signal is paused.

In step 508, the streaming signal output module 312 may resume output of the contents of the streaming signal after the advertisement end time. In some examples, the contents of the original streaming signal between the advertisement start time and the advertisement end time will not be output by the mobile device 212. Instead, the streaming signal output module 312 may resume output of the streaming signal at the advertisement end time in real-time or in near real-time.

Alternatively, in examples where the streaming signal modification module 310 paused receiving the streaming signal in real-time for the duration of the selected advertisement, the streaming signal modification module 310 may then un-pause (or resume) receiving the streaming signal in real-time after the advertising end time. By pausing and un-pausing receiving the streaming signal in real-time, the streams signal modification module 310 advantageously limits content loss of the original streaming signal for the duration of the selected advertisement.

Figure 6:
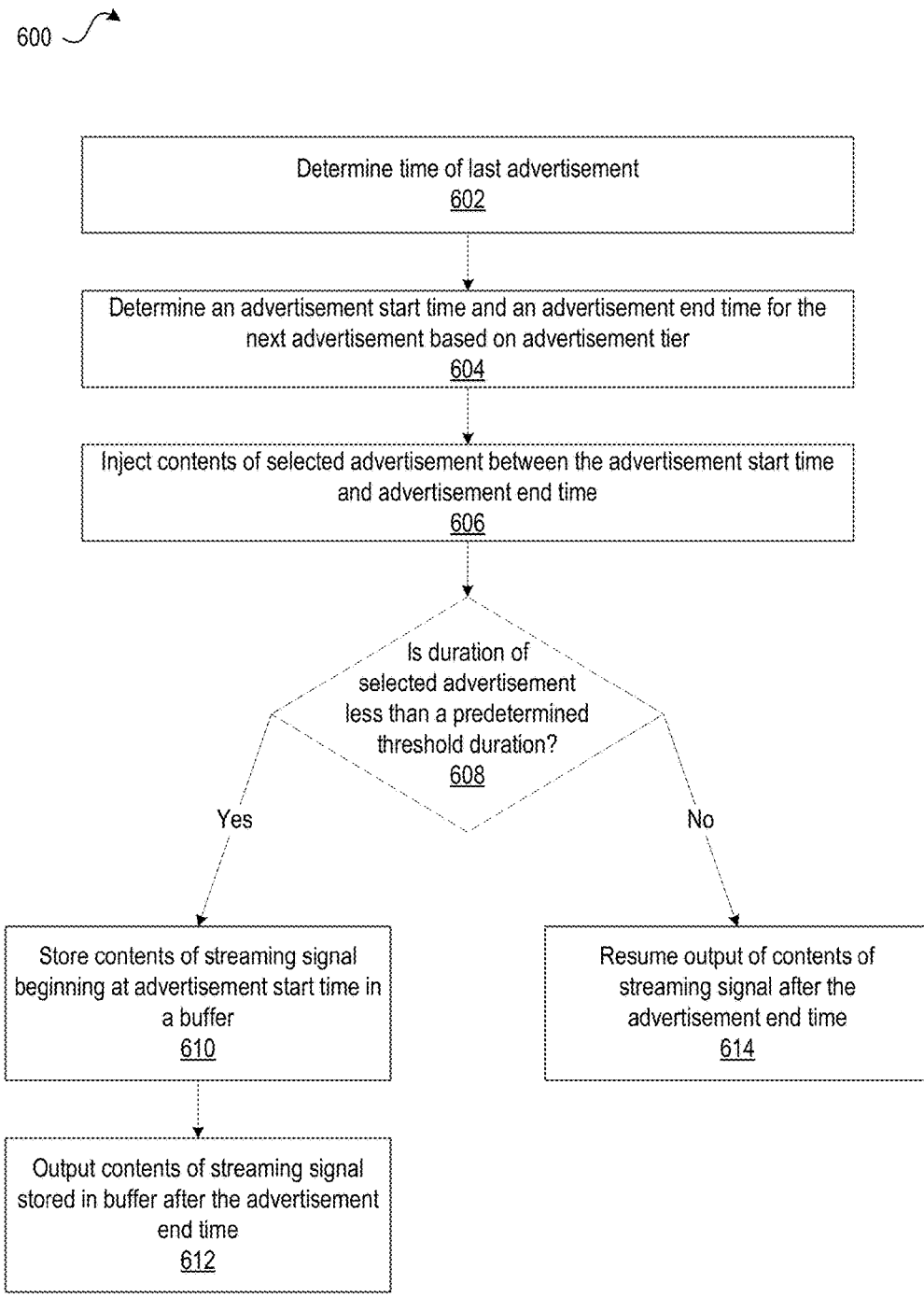
FIG. 6 is a flowchart of example methods steps for modifying a streaming signal to inject a selected advertisement at a determined advertisement frequency using a buffer to minimize content loss, according to one or more aspects of the disclosure.

Referring now to FIG. 6, a flowchart 600 of example method steps for modifying a streaming signal to inject a selected advertisement at a determined advertisement frequency using a buffer to minimize content loss is shown. The steaming signal modification module 310 of the advertisement frequency modulation device 202 and/or of the advertisement frequency modulation unit 230 may be used to perform these method steps. Steps 602-606 may be implemented by the streaming signal modification module 310 as described above with reference to steps 502-506.

In step 608, the streaming signal modification module 310 may determine whether the duration of the selected advertisement is less than a predetermined threshold duration.

Where the duration of the selected advertisement is less than the predetermined threshold duration, the streaming signal modification module 310 may, in step 610, store the contents of the streaming signal from the advertisement start time in a buffer. As such, the streaming signal modification module 310 may store the contents of the original streaming signal starting at the timestamp at which the streaming signal was interrupted by the selected advertisement in a buffer. In step 612, the streaming signal output module 312 may output the contents of the streaming signal stored in the buffer after the advertisement end time. The outputted contents of the streaming signal may be cleared from the buffer to maximize storage capacity and efficiency of the advertisement frequency modulation device 202.

Alternatively, where the duration of the selected advertisement is greater than the predetermined threshold, the streaming signal modification module 310 may not store the contents of the streaming signal in a buffer. Instead, the streaming signal modification module 310 may resume output of the contents of the streaming signal after the advertisement end time in step 614, as described with reference to step 508 of FIG. 5.

Figure 7:
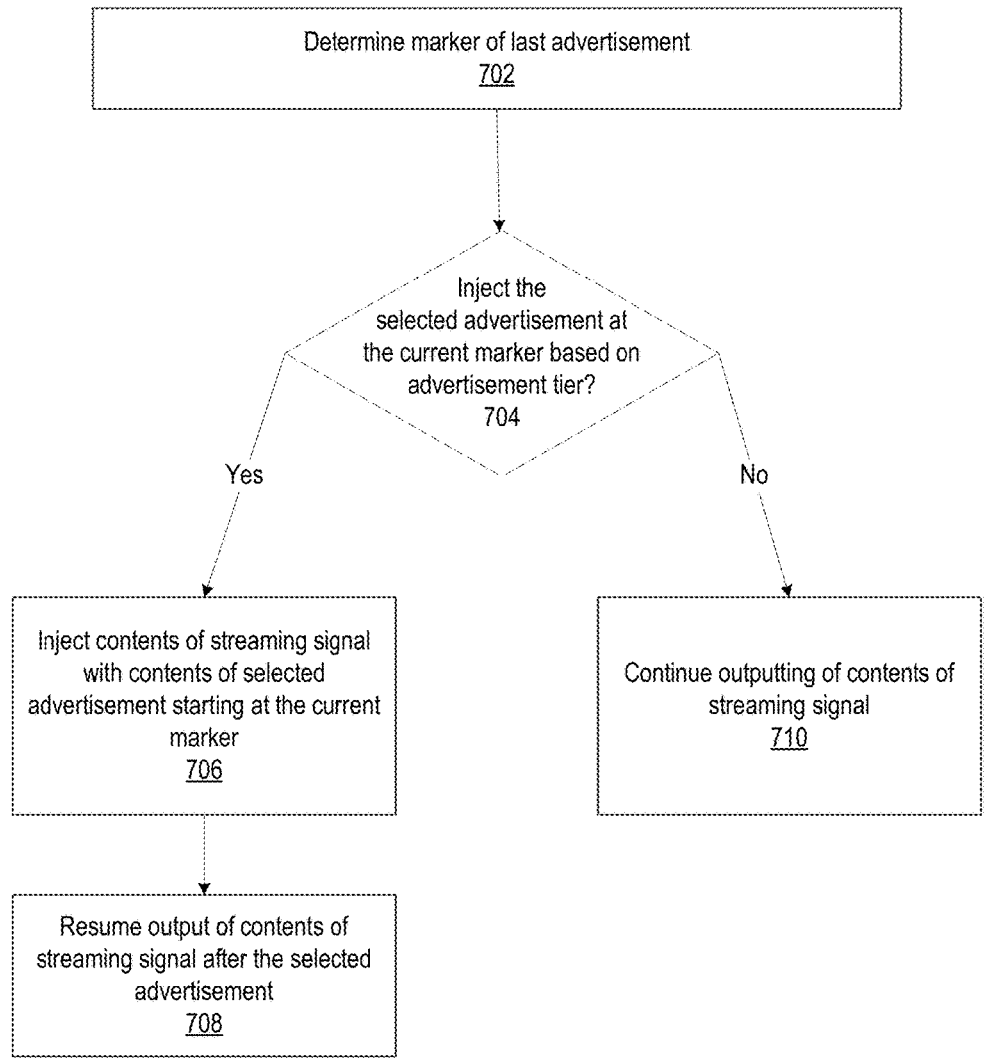
FIG. 7 is a flowchart of example method steps for modifying a streaming signal to inject a selected advertisement at a determined advertisement frequency based on markers, according to one or more aspects of the disclosure.

Referring now to FIG. 7, a flowchart 700 of example method steps for modifying a streaming signal to inject a selected advertisement at a determined advertisement frequency using markers is shown. As such, these method steps may be used in cases where the streaming signal includes markers indicating starting times at which advertisements may be injected. The streaming signal may include markers at a particular frequency (e.g., the frequency of associated with the highest advertisement tier). In such examples, the advertisement frequency associated with an advertisement tier may be based on the markers (e.g., every 1 marker, every 2 markers, every 5 markers, etc.). In some examples, the streaming signal may include default advertisements (or non-essential content) starting at the markers. The streaming signal modification module 310 of the advertisement frequency modulation device 212 and/or of the advertisement frequency modulation unit 230 may be used to perform these method steps.

In step 702, the streaming signal modification module 310 may determine a marker of the last advertisement. The last advertisement may be an advertisement that was included as part of the streaming signal based on the default advertisement tier, or may have been injected by the advertisement frequency modulation device 202 into the streaming signal. In some examples, the streaming signal modification module 310 may determine the number of markers between the marker of the last advertisement and the current marker. For instance, where the last advertisement was injected at the first marker of the streaming signal, and the streaming signal modification module 310 detects the third marker in the streaming signal, the streaming signal modification module 310 may determine the number of markers between the marker of the last advertisement and the current marker to be two markers. In examples where the current marker is the first marker of the streaming signal, the streaming signal modification module 310 may determine the number of markers between the marker of the last advertisement and the current marker to be zero markers.

In step 704, the streaming signal modification module 310 may determine whether to inject the selected advertisement at the current marker based on the advertisement tier determined in step 408. As such, the streaming signal modification module 310 may determine whether to inject the selected advertisement at the current marker based on the number of markers between the marker of the last advertisement and the current marker, as determined in step 702, and the advertisement frequency prescribed by the advertisement tier determined in step 408. For instance, where the advertisement tier prescribes injecting an advertisement every 1 marker, the streaming signal modification module 310 may output a decision to inject the selected advertisement at the current marker. In another example, where the advertisement tier prescribes injecting an advertisement every 3 markers, the streaming signal modification module 310 may output a decision to inject the selected advertisement at the current marker if the number of markers between the marker of the last advertisement and the current marker is three markers. In contrast, where the advertisement tier prescribes injecting an advertisement every 3 markers, the streaming signal modification module 310 may output a decision not to inject the selected advertisement at the current marker if the number of markers between the marker of the last advertisement and the current marker is less than three markers.

Where the streaming signal modification module 310 outputs a decision to inject the selected advertisement at the current marker in step 704, the streaming signal modification module 310 may inject the contents of the streaming signal with the contents of the selected advertisement starting at the current marker in step 706. In examples where the streaming signal includes default advertisements or non-essential content starting at the current marker, the streaming signal modification module 310 may replace the default advertisement or non-essential content with the selected advertisement. In these examples, the streaming signal output module 312 may cause the mobile device 212 to output the contents of the selected advertisement starting at the current marker, instead of the contents of the default advertisement or non-essential content.

In examples where the streaming signal does not include default advertisements or non-essential content starting at the current marker, the streaming signal modification module 310 may inject the contents of the selected advertisement at the current marker. In these examples, the streaming signal output module 312 may cause the mobile device 212 to output the contents of the selected advertisement starting at the current marker, instead of the contents of the original streaming signal. Thus, starting at the current marker, the streaming signal modification module 310 may substitute the contents of the selected advertisement for the contents of the original streaming signal.

Alternatively, the streaming signal modification module 310 may pause receiving the streaming signal in real-time for the duration of the selected advertisement. In these examples, the streaming signal output module 312 may cause the mobile device 212 to output the contents of the selected advertisement starting at the current marker while the real-time streaming signal is paused.

In step 708, the streaming signal modification module 310 may resume output of the contents of the streaming signal after the selected advertisement. In some examples, the contents of the original streaming signal during the time interval used by the selected advertisement will not be output by the mobile device 212. Instead, the streaming signal output module 312 may resume output of the streaming signal following the selected advertisement in real-time or in near real-time.

Alternatively, in examples where the streaming signal modification module 310 paused receiving the streaming signal in real-time for the duration of the selected advertisement, the streaming signal modification module 310 may then un-pause (or resume) receiving the streaming signal in real-time after the selected advertisement. By pausing and un-pausing receiving the streaming signal in real-time, the streams signal modification module 310 advantageously limits content loss of the original streaming signal for the duration of the selected advertisement.

Where the streaming signal modification module 310 outputs a decision not to inject the selected advertisement at the current marker in step 704, the streaming signal modification module 310 may continue to output the contents of the original streaming signal. In examples where the original streaming signal includes default advertisements or non-essential data starting at the markers, the original streaming signal starting at the current marker may include the default advertisements or non-essential content such that the streaming signal remains "live" following default advertisements or non-essential content. In examples where the original streaming signal does not include default advertisements or non-essential data starting at the markers, the streaming signal modification module 310 may continue to output the contents of the original streaming signal in real-time or in near real-time.

Figure 8:
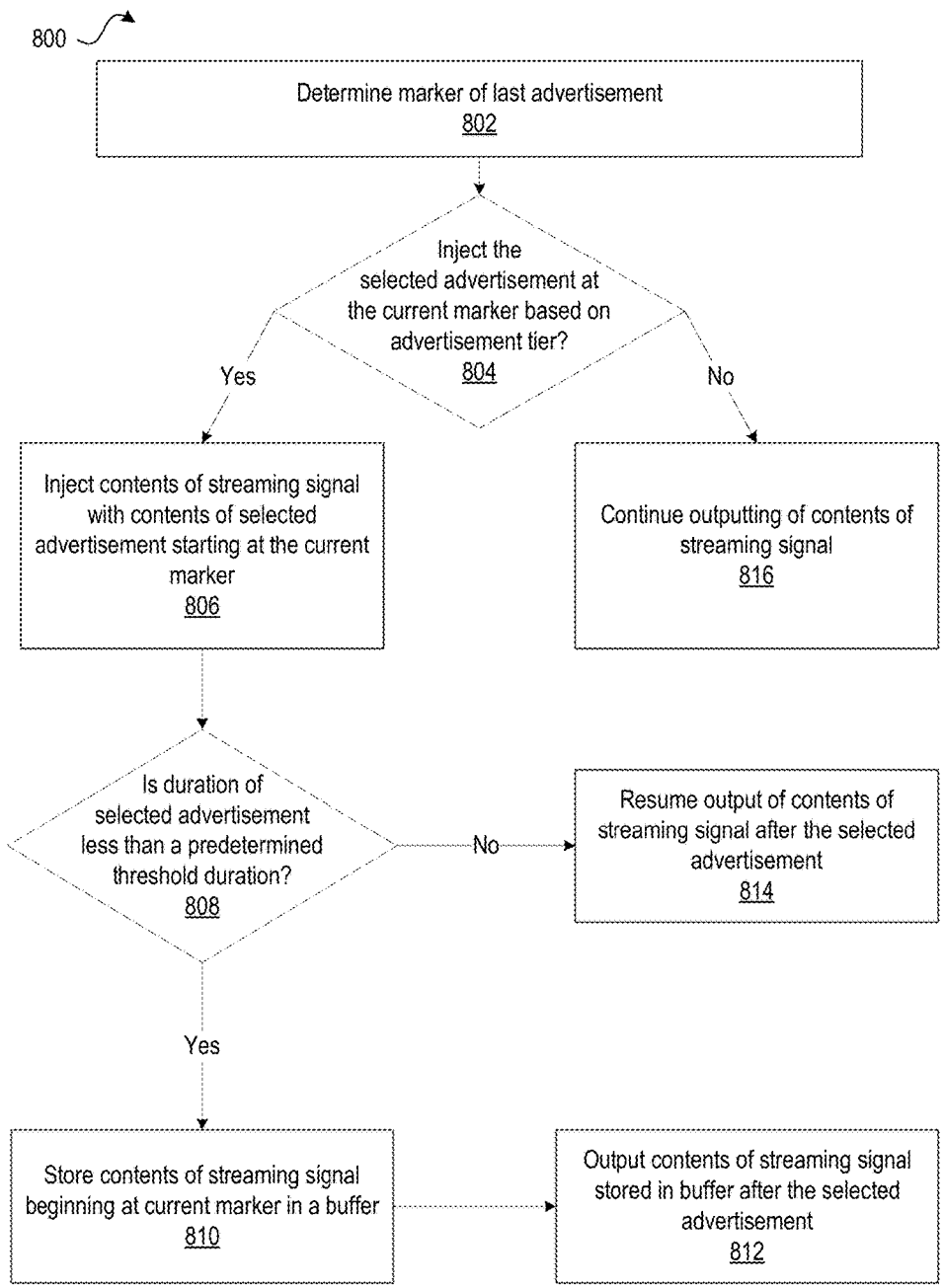
FIG. 8 is a flowchart of example method steps for modifying a streaming signal to inject a selected advertisement at a determined advertisement frequency using a buffer to minimize content loss based on markers, according to one or more aspects of the disclosure.

Referring now to FIG. 8, a flowchart 800 of example methods steps for modifying a streaming signal to inject a selected advertisement at a determined advertisement frequency using a buffer to minimize content loss based on markers is shown. In these examples, the streaming signal may not include default advertising or non-essential data starting at the markers. The streaming signal modification module 310 of the advertisement frequency modulation device 212 and/or of the advertisement frequency modulation unit 230 may be used to perform these method steps. Steps 802-806 may be implemented by the streaming signal modification module 310 as described above with reference with steps 702-706.

In step 808, the streaming signal modification module 310 may determine whether the duration of the selected advertisement is less than a predetermined threshold duration.

Where the duration of the selected advertisement is less than the predetermined threshold duration, the streaming signal modification module 310 may, in step 810, store the contents of the streaming signal beginning at the current marker in a buffer. As such, the streaming signal modification module 310 may store the contents of the original streaming signal starting at the time at which the streaming signal was interrupted by the selected advertisement in a buffer. In step 812, the streaming signal output module 312 may output the contents of the streaming signal stored in the buffer after the selected advertisement. The outputted contents of the streaming signal may be cleared from the buffer to maximize storage capacity and efficiency of the advertisement frequency modulation device 202.

Alternatively, where the duration of the selected advertisement is greater than the predetermined threshold, the streaming signal modification module 310 may not store the contents of the streaming signal in a buffer. Instead, the streaming signal modification module 310 may resume output of the contents of the streaming signal after the selected advertisement in step 814, as described with reference to step 708 of FIG. 7.

Referring back to FIG. 4, in step 414, the sensor data collection module 302 may continue collecting sensor data. As such, method steps 404-412 may be repeated, such that the risk determination module 304 may recalculate a risk score based on the new sensor data, the advertisement tier determination module 306 may re-determine an advertisement tier based on the new risk score, and the advertisement selection module 308 may re-select advertisements based on at least the new risk score and/or the new advertisement tier. Accordingly, the streaming signal modification module 310 may inject the new advertisements at the new advertisement tier, and the streaming signal output module 312 may output the modified streaming signal to the mobile device 212.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:

1. An improved media streaming device comprising:
an audio output interface through which signals corresponding to media content and interspersed advertisements are streamed;
at least one processor; and
memory storing computer-readable instructions that, when executed by the at least one processor, cause the device to:
receive, from a streaming content provider system, a streaming signal associated with a default advertisement tier, wherein the streaming signal comprises media content and advertisement content, wherein the default advertisement tier is associated with a baseline advertisement frequency, and wherein the advertisement content occurs in between the media content at a basement frequency;
output, via the audio output interface, the streaming signal;
collect, by a sensor data collection module, sensor data from sensors associated with a vehicle and a mobile device within the vehicle, wherein the sensors comprise an accelerometer, a GPS receiver, and a gyroscope;
receive, from a risk determination module, a risk score calculated based, at least in part, on the sensor data, wherein the risk score is based on a plurality of factors, and wherein the plurality of factors comprise a speed of the vehicle, a rate of acceleration of the vehicle, a road type, a weather, and a time of day;
determine, by an advertisement tier determination module of the device, an first advertisement tier based, at least in part, on the risk score, wherein the first advertisement tier is associated with a first advertisement frequency, wherein the first advertisement frequency is greater than the baseline advertisement frequency, wherein the first advertisement tier is associated with a first predetermined threshold risk score, and wherein the risk score is greater than the first predetermined threshold risk score;
select, by an advertisement selection module of the device, a first advertisement based, at least in part, on the sensor data, the risk score, the advertisement tier, and a plurality of contextual attributes;
modify, by a streaming signal modification module of the device, the streaming signal to inject the first advertisement based on the first advertisement frequency associated with the first advertisement tier, wherein the media content of the streaming signal is substituted by the first advertisement for a first duration associated with the first advertisement;
output, via the audio output interface and by a streaming signal output module of the media streaming device, the streaming signal comprising the first advertisement followed by the media content;
receive, from the risk determination module, an improved risk score based on additional sensor data associated with the vehicle and the mobile device;
responsive to receiving the improved risk score, determine, by the advertisement tier determination module, a second advertisement tier based, at least in part, on the improved risk score, wherein the second advertisement tier is associated with a second advertisement frequency, wherein the second advertisement frequency is less than the first advertisement frequency, wherein the second advertisement tier is associated with a second predetermined threshold risk score, and wherein the improved risk score is less than the first predetermined threshold risk score and greater than the second predetermined threshold risk score;

select, by the advertisement selection module, a second advertisement based, at least in part, on the additional sensor data, the improved risk score, the second advertisement tier, and the plurality of contextual attributes;

modify, by the streaming signal modification module, the streaming signal to inject the second advertisement based on the second advertisement frequency associated with the second advertisement tier, wherein the media content of the streaming signal is substituted by the second advertisement for a second duration associated with the second advertisement; and output, via the audio output interface and by the streaming signal output module, the streaming signal comprising the second advertisement followed by the media content.

2. The system of claim 1, further including instructions that, when executed by the at least one processor, cause the system to:

determine, by the streaming signal modification module, a time of a last advertisement in the streaming signal output via the audio output interface;

determine, by the streaming signal modification module, an advertisement start time and an advertisement end time based, at least in part, on the time of the last advertisement and the first advertisement tier;

inject, by the streaming signal modification module, the media content of the streaming signal between the advertisement start time and the advertisement end time with the first advertisement;

output, via the audio output interface and by the streaming signal output module, the first advertisement between the advertisement start time and the advertisement end time; and output, via the audio output interface and by the streaming signal output module, the media content of the streaming signal after the advertisement end time.

3. The system of claim 1, further including instructions that, when executed by the at least one processor, cause the system to:

determine, by the streaming signal modification module, a time of a last advertisement in the streaming signal output via the audio output interface;

determine, by the streaming signal modification module, an advertisement start time and an advertisement end time based, at least in part, on the time of the last advertisement and the first advertisement tier;

inject, by the streaming signal modification module, the media of the streaming signal between the advertisement start time and the advertisement end time with the first advertisement;

output, via the audio output interface and by the streaming signal output module, the first advertisement between the advertisement start time and the advertisement end time; and store, by the streaming signal modification module, the media content of the streaming signal beginning at the advertisement start time in a buffer, wherein the duration of the first advertisement is less than a predetermined threshold duration; and output, via the audio output interface and by the streaming signal output module, the media content of the streaming signal stored in the buffer after the advertisement end time.

4. The system of claim 1, wherein the streaming signal is an audio signal.

5. The system of claim 1, wherein the advertisement tier is associated with the mobile device.

6. The system of claim 5, further including instructions that, when executed by the at least one processor, cause the system to:

receive, from the streaming content provider system, a second streaming signal associated with the first advertisement tier, wherein the first advertisement tier is different from the default advertisement tier, and wherein the second streaming signal comprises media content and advertisement content; and modify, by the streaming signal modification module, the second streaming signal to inject the first advertisement based on the first advertisement frequency associated with the first advertisement tier; and output, via the audio output interface and by the streaming signal output module, the first advertisement; and output, via the audio output interface and by the streaming signal output module, the media content of the second streaming signal.

7. The system of claim 6, further including instructions that, when executed by the at least one processor, cause the system to:

reassociate, by the advertisement tier determination module, the mobile device with the default advertisement tier upon termination of an expiry duration associated with the first advertisement tier.

8. A method comprising:

receiving, by an improved media streaming device in a car and from a streaming content provider system, a streaming signal associated with a default advertisement tier, wherein the streaming signal comprises media content and advertisement content, and wherein the advertisement content occurs in between the media content at a first advertisement frequency;

outputting, via an audio output interface of the improved media streaming device, the streaming signal;

increasing a recurrence of advertisements in the streaming signal to a second advertisement frequency by inserting advertisement content at a first predetermined interval between the media content based on sensor data associated with the car, wherein the sensor data indicates unsafe driving behavior, wherein the second advertisement frequency is greater than the first advertisement frequency, and wherein the step is performed by:

collecting, by a sensor data collection module, sensor data from sensors associated with the car and a mobile device within the car, wherein the sensors comprise an accelerometer, a GPS receiver, and a gyroscope;

receiving, from a risk determination module, a risk score calculated based, at least in part, on the sensor data, wherein the risk score is based on a plurality of factors, wherein the plurality of factors comprise a speed of the car, a rate of acceleration of the car; a road type, a weather, and a time of day;

determining, by an advertisement tier determination module of the improved media streaming device, a first advertisement tier based, at least in part, on the risk score, wherein the first advertisement tier is associated with the second advertisement frequency, wherein the first advertisement tier is associated with a first predetermined threshold risk score, and wherein the risk score is greater than the first predetermined threshold risk score;

selecting, by an advertisement selection module of the improved media streaming device, a first plurality of advertisements based, at least in part, on the sensor data, the risk score, the first advertisement tier, and a plurality of contextual attributes;

modifying, by a streaming signal modification module of the improved media streaming device, the streaming signal to inject the first plurality of advertisements based on the second advertisement frequency associated with the first advertisement tier, wherein the media content of the streaming signal is substituted by at least one of the first plurality of advertisements for a first duration associated with the at least one of the first plurality of advertisements; and outputting, via the audio output interface of the improved media streaming device, the streaming signal;

receiving, from the risk determination module, an improved risk score based on additional sensor data associated with the car and the mobile device;

responsive to receiving the improved risk score, increasing the recurrence of advertisements in the streaming signal to a third advertisement frequency by inserting advertisement content at a second predetermined interval between the media content based on the improved risk score, wherein the third advertisement frequency is less than the second advertisement frequency, and wherein the step is performed by:

determining, by the advertisement tier determination module of the improved media streaming device, a second advertisement tier based, at least in part, on the improved risk score, wherein the second advertisement tier is associated with the third advertisement frequency, wherein the second advertisement tier is associated with a second predetermined threshold risk score, and wherein the improved risk score is less than the first predetermined threshold risk score and greater than the second predetermined threshold risk score;

selecting, by the advertisement selection module, a second plurality of advertisements based, at least in part, on the additional sensor data, the improved risk score, the second advertisement tier, and the plurality of contextual attributes;

modifying, by the streaming signal modification module, the streaming signal to inject the second plurality of advertisements based on the third advertisement frequency associated with the second advertisement tier, wherein the media content of the streaming signal is substituted by at least one of the second plurality of advertisements for a second duration associated with the at least one of the second plurality of advertisements; and outputting, via the audio output interface of the improved media streaming device, the streaming signal.

9. The method of claim 8, wherein modifying the streaming signal to inject the first plurality of advertisements at the second advertisement frequency associated with the first advertisement tier includes:

determining, by the streaming signal modification module, a time of a last advertisement in the streaming signal output via the audio output interface;

determining, by the streaming signal modification module, an advertisement start time and an advertisement end time based, at least in part, on the time of the last advertisement and the first advertisement tier;

replacing, by the streaming signal modification module, the media content of the streaming signal between the advertisement start time and the advertisement end time with the at least one of the first plurality of advertisements;

outputting, via the audio output interface of the improved media streaming device, the at least one of the first plurality of advertisements between the advertisement start time and the advertisement end time; and outputting, via the audio output interface of the improved media streaming device, the media content of the streaming signal after the advertisement end time.

10. The method of claim 8, wherein modifying the streaming signal to inject the plurality of advertisements at the advertisement frequency associated with the advertisement frequency includes:

determining, by the streaming signal modification module, a time of a last advertisement in the streaming signal output via the audio output interface;

determining, by the streaming signal modification module, an advertisement start time and an advertisement end time based, at least in part, on the time of the last advertisement and the first advertisement tier;

replacing, by the streaming signal modification module, the media content of the streaming signal between the advertisement start time and the advertisement end time with the at least one of the first plurality of advertisements;

storing, by the streaming signal modification module, the media content of the streaming signal beginning at the advertisement start time in a buffer, wherein a first duration of the at least one of the first plurality of advertisements is less than a predetermined threshold duration;

outputting, via the audio output interface of the improved media streaming device, the at least one of the first plurality of advertisements between the advertisement start time and the advertisements end time; and outputting, via the audio output interface of the improved media streaming device, the media content of the streaming signal stored in the buffer after the advertisement end time.

11. The method of claim 8, wherein the streaming signal is an audio signal.

12. The method of claim 8, wherein the advertisement tier is associated with the mobile device.

13. The method of claim 12, further comprising:

receiving, from the streaming content provider system, a second streaming signal associated with the first advertisement tier, wherein the first advertisement tier is different from the default advertisement tier, and wherein the second streaming signal comprises media content and advertisement content;

modifying, by the streaming signal modification module, the second streaming signal to inject the first plurality of advertisements based on the second advertisement frequency associated with the first advertisement tier;

outputting, via the audio output interface of the improved media streaming device, at least one of the first plurality of advertisements; and outputting, via the audio output interface of the improved media streaming device, the media content of the second streaming signal.

14. The method of claim 13, further comprising:

reassociating, by the advertisement tier determination module, the mobile device with the default advertisement tier upon termination of an expiry duration associated with the first advertisement tier.

15. A computer-assisted method of modulating advertisement frequency in streaming signals comprising:
- receiving, by an improved media streaming device in a car and from a streaming content provider system, a streaming signal associated with a default advertisement tier, wherein the streaming signal comprises media content and advertisement content, and wherein the advertisement content occurs in between the media content at a first advertisement frequency;
- outputting, via an audio output interface of the improved media streaming device, the streaming signal;
- increasing a recurrence of advertisements in the streaming signal to a second advertisement frequency by inserting advertisement content at a first predetermined interval between the media content based on sensor data associated with the car, wherein the sensor data indicates unsafe driving behavior, wherein the second advertisement frequency is greater than the first advertisement frequency, and wherein the step is performed by:
  - collecting, by a sensor data collection module, sensor data from sensors associated with the car and a mobile device within the car, wherein the sensors comprise an accelerometer, a GPS receiver, and a gyroscope;
  - receiving, from a risk determination module, a risk score calculated based, at least in part, on the sensor data, wherein the risk score is based on a plurality of factors, wherein the plurality of factors comprise a speed of the car, a rate of acceleration of the car; a road type, a weather, and a time of day;
  - determining, by an advertisement tier determination module of the improved media streaming device, a first advertisement tier based, at least in part, on the risk score, wherein the first advertisement tier is associated with the second advertisement frequency, wherein the first advertisement tier is associated with a first predetermined threshold risk score, and wherein the risk score is greater than the first predetermined threshold risk score;
  - selecting, by an advertisement selection module of the improved media streaming device, a first plurality of advertisements based, at least in part, on the sensor data, the risk score, the first advertisement tier, and a plurality of contextual attributes;
  - modifying, by a streaming signal modification module of the improved media streaming device, the streaming signal to inject the first plurality of advertisements based on the second advertisement frequency associated with the first advertisement tier, wherein the media content of the streaming signal is substituted by at least one of the first plurality of advertisements for a first duration associated with the at least one of the first plurality of advertisements; and
  - outputting, via the audio output interface of the improved media streaming device, the streaming signal;
- receiving, from the risk determination module, an improved risk score based on additional sensor data associated with the car and the mobile device;
- responsive to receiving the improved risk score, increasing the recurrence of advertisements in the streaming signal to a third advertisement frequency by inserting advertisement content at a second predetermined interval between the media content based on the improved risk score, wherein the third advertisement frequency is less than the second advertisement frequency, and wherein the step is performed by:
  - determining, by the advertisement tier determination module of the improved media streaming device, a second advertisement tier based, at least in part, on the improved risk score, wherein the second advertisement tier is associated with the third advertisement frequency, wherein the second advertisement tier is associated with a second predetermined threshold risk score, and wherein the improved risk score is less than the first predetermined threshold risk score and greater than the second predetermined threshold risk score;
  - selecting, by the advertisement selection module, a second plurality of advertisements based, at least in part, on the additional sensor data, the improved risk score, the second advertisement tier, and the plurality of contextual attributes;
  - modifying, by the streaming signal modification module, the streaming signal to inject the second plurality of advertisements based on the third advertisement frequency associated with the second advertisement tier, wherein the media content of the streaming signal is substituted by at least one of the second plurality of advertisements for a second duration associated with the at least one of the second plurality of advertisements; and
  - outputting, via the audio output interface of the improved media streaming device, the streaming signal.

16. The computer-assisted method of claim 15, wherein modifying the streaming signal to inject the first plurality of advertisements at the second advertisement frequency associated with the first advertisement tier includes:
- determining, by the streaming signal modification module, a time of a last advertisement in the streaming signal output via the audio output interface;
- determining, by the streaming signal modification module, an advertisement start time and an advertisement end time based, at least in part, on the time of the last advertisement and the first advertisement tier;
- replacing, by the streaming signal modification module, the media content of the streaming signal between the advertisement start time and the advertisement end time with the at least one of the first plurality of advertisements;
- outputting, via the audio output interface of the improved media streaming device, the at least one of the first plurality of advertisements between the advertisement start time and the advertisement end time; and
- outputting, via the audio output interface of the improved media streaming device, the media content of the streaming signal after the advertisement end time.

17. The computer-assisted method of claim 15, wherein modifying the streaming signal to inject the first plurality of advertisements at the second advertisement frequency associated with the first advertisement tier includes:
- determining, by the streaming signal modification module, a time of a last advertisement in the streaming signal output via the audio output interface;
- determining, by the streaming signal modification module, an advertisement start time and an advertisement end time based, at least in part, on the time of the last advertisement and the first advertisement tier;
- replacing, by the streaming signal modification module, the media content of the streaming signal between the advertisement start time and the advertisement end time with the at least one of the first plurality of advertisements;

storing, by the streaming signal modification module, the media content of the streaming signal beginning at the advertisement start time in a buffer, wherein the first duration of the at least one of the first plurality of advertisements is less than a predetermined threshold duration;

outputting, via the audio output interface of the improved media streaming device, the at least one of the first plurality of advertisements between the advertisement start time and the advertisements end time; and outputting, via the audio output interface of the improved media streaming device, the media content of the streaming signal stored in the buffer after the advertisement end time.

18. The computer-assisted method of claim 15, wherein the advertisement tier is associated with the mobile device.

19. The computer-assisted method of claim 18, further comprising:

receiving, from the streaming content provider system, a second streaming signal associated with the first advertisement tier, wherein the first advertisement tier is different from the default advertisement tier, and wherein the second streaming signal comprises media content and advertisement content;

modifying, by the streaming signal modification module, the second streaming signal to inject the first plurality of advertisements based on the second advertisement frequency associated with the first advertisement tier;

outputting, via the audio output interface of the improved media streaming device, at least one of the first plurality of advertisements; and outputting, via the audio output interface of the improved media streaming device, the media content of the second streaming signal.

20. The computer-assisted method of claim 19, further comprising:

reassociating, by the advertisement tier determination module, the mobile device with the default advertisement tier upon termination of an expiry duration associated with the first advertisement tier.

\* \* \* \* \*